(12) United States Patent
Kuroyanagi

(10) Patent No.: US 8,258,668 B2
(45) Date of Patent: Sep. 4, 2012

(54) STATOR AND ROTATING ELECTRIC MACHINE EMPLOYING THE SAME

(75) Inventor: Toru Kuroyanagi, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 273 days.

(21) Appl. No.: 12/733,447

(22) PCT Filed: Dec. 19, 2008

(86) PCT No.: PCT/JP2008/073170
§ 371 (c)(1),
(2), (4) Date: Mar. 2, 2010

(87) PCT Pub. No.: WO2009/084473
PCT Pub. Date: Jul. 9, 2009

(65) Prior Publication Data
US 2010/0253161 A1    Oct. 7, 2010

(30) Foreign Application Priority Data
Dec. 27, 2007  (JP) .................... 2007-337002

(51) Int. Cl.
*H02K 1/16* (2006.01)
*H02K 3/28* (2006.01)

(52) U.S. Cl. .............. 310/216.008; 310/44; 310/184; 310/216.019

(58) Field of Classification Search .......... 310/184, 310/216.008, 216.015, 216.019
See application file for complete search history.

(56) References Cited

U.S. PATENT DOCUMENTS

| | | | | |
|---|---|---|---|---|
| 3,662,199 A * | 5/1972 | Anderson et al. | ............. | 310/208 |
| 5,936,326 A * | 8/1999 | Umeda et al. | ............. | 310/179 |
| 6,140,735 A | 10/2000 | Kato et al. | | |
| 6,222,296 B1 * | 4/2001 | Sakai et al. | ............. | 310/216.019 |
| 6,455,977 B2 * | 9/2002 | Leyvraz et al. | ............. | 310/429 |
| 6,608,419 B2 * | 8/2003 | Shah et al. | ............. | 310/216.076 |
| 2002/0047473 A1 | 4/2002 | Laurent et al. | | |
| 2005/0029897 A1 | 2/2005 | Laurent et al. | | |
| 2007/0262659 A1 | 11/2007 | Inayama | | |

FOREIGN PATENT DOCUMENTS

| | | |
|---|---|---|
| JP | U-7-23954 | 5/1995 |
| JP | A-10-304608 | 11/1998 |
| JP | A-2000-139042 | 5/2000 |
| JP | A-2000-139048 | 5/2000 |

(Continued)

OTHER PUBLICATIONS

International Search Report for International Application No. PCT/JP2008/073170, issued Mar. 31, 2009.

(Continued)

*Primary Examiner* — Burton Mullins
(74) *Attorney, Agent, or Firm* — Oliff & Berridge, PLC

(57) ABSTRACT

A stator in which coil conductors of three phases are disposed in a plurality of slots provided in a stator core, wherein the coil conductors are formed by connecting a plurality of slot conductor portions disposed in the slot, a plurality of coil end conductor portions extending in a circumferential direction of the stator core on an outer side of an axial end surface of the stator core, and a plurality of upstanding conductor portions, each of which connects the coil end conductor portion and the slot conductor portion.

12 Claims, 26 Drawing Sheets

FOREIGN PATENT DOCUMENTS

| | | |
|---|---|---|
| JP | A-2000-272046 | 10/2000 |
| JP | A-2002-084689 | 3/2002 |
| JP | A-2003-199267 | 7/2003 |
| JP | A-2003-309964 | 10/2003 |
| JP | A-2004-159476 | 6/2004 |
| JP | A-2006-067763 | 3/2006 |
| JP | A-2007-306740 | 11/2007 |
| JP | A-2008-148482 | 6/2008 |

OTHER PUBLICATIONS

Dec. 6, 2011 Office Action issued in Japanese Patent Application No. 2009-548012 (English Translation only).

* cited by examiner

F I G . 13
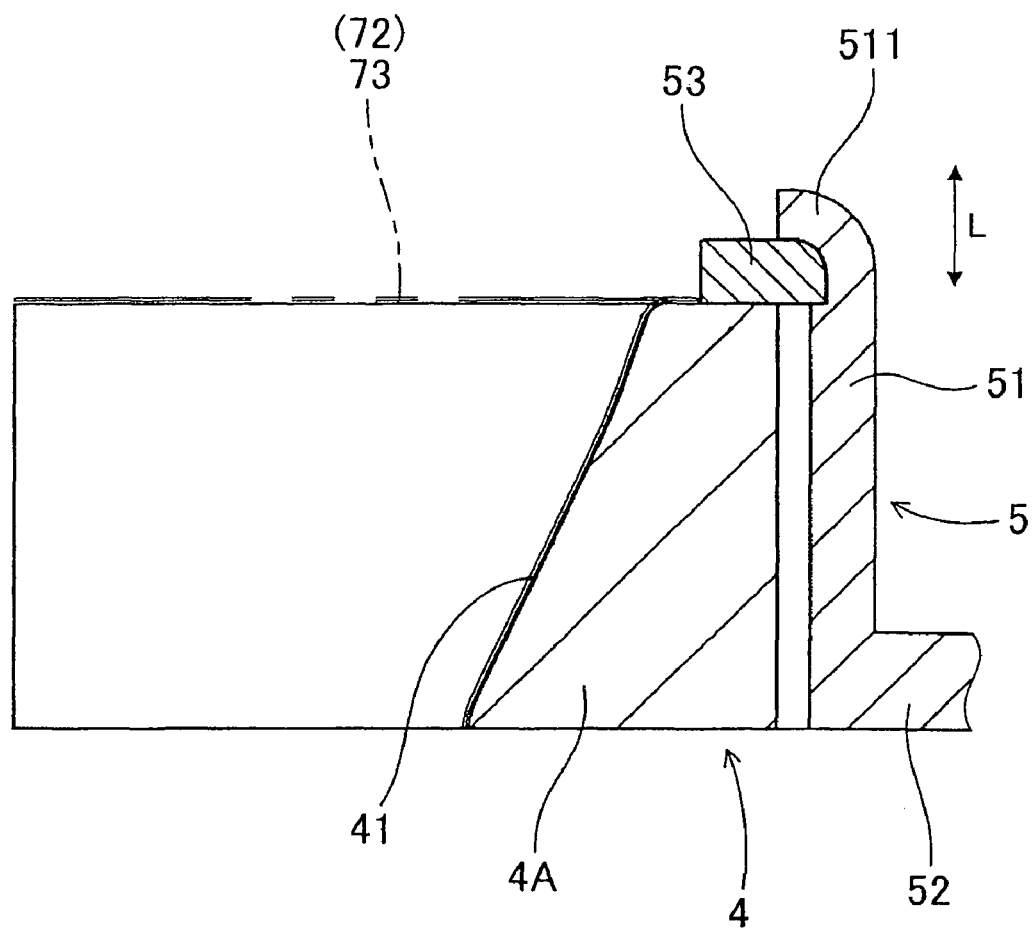

F I G . 14
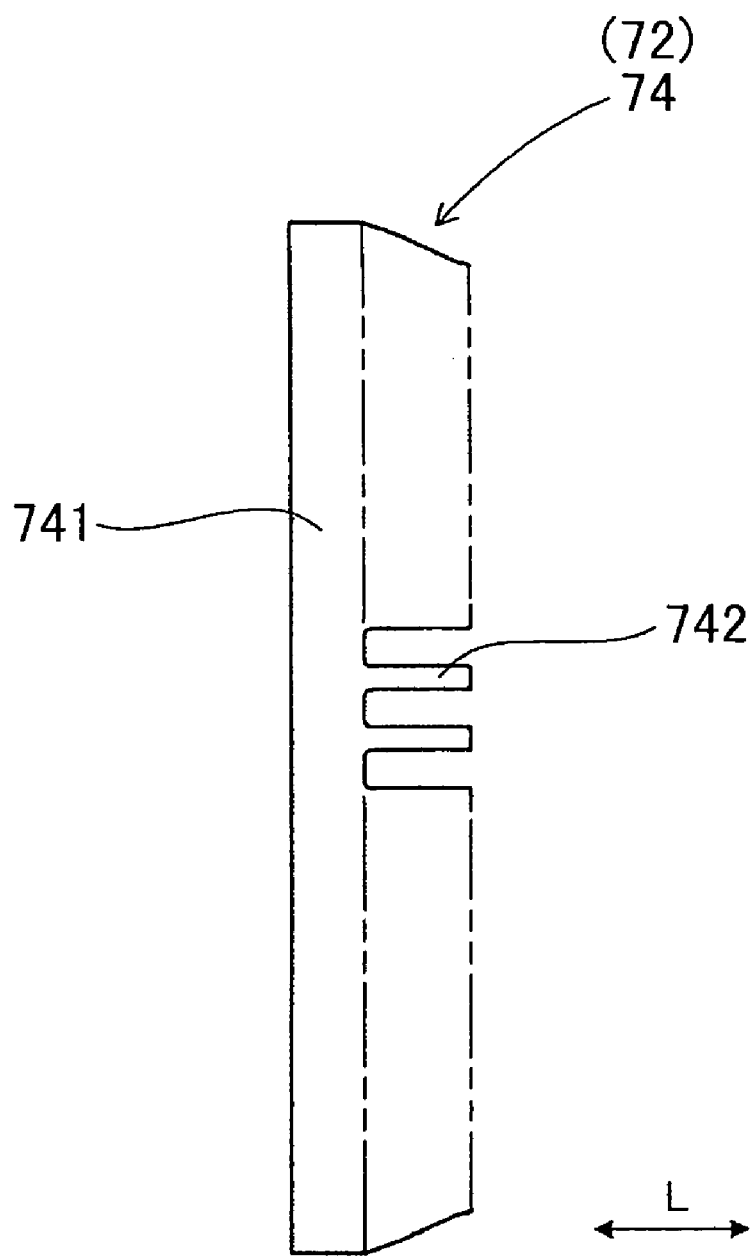

F I G . 23
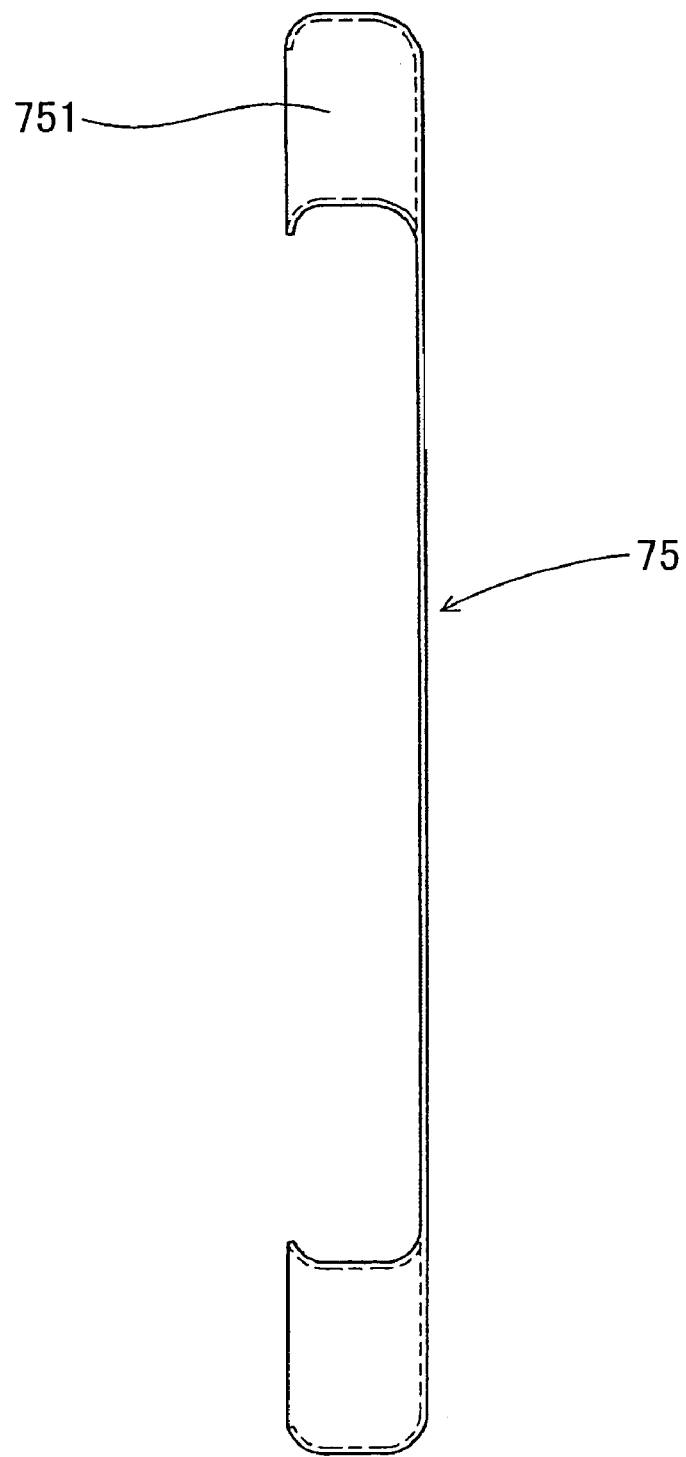

STATOR AND ROTATING ELECTRIC MACHINE EMPLOYING THE SAME

INCORPORATION BY REFERENCE

This application is the U.S. National Phase of PCT/JP2008/073170 filed on Dec. 19, 2008, which claims priority from Japanese Patent Application No. 2007-337002 filed on Dec. 27, 2007, the specification, drawings and abstract of which are incorporated herein by reference in their entirety.

BACKGROUND

The present invention relates to a stator and a rotating electric machine such as a motor or a generator that employs the stator, and more particularly to a shape of a stator core.

In a stator for a rotating electric machine such as a motor, a generator, or a motor/generator used in an automobile or the like, the stator is normally formed by disposing coil conductors linearly in slots provided parallel to an axial direction of a stator core and causing remaining portions of the coil conductors to project from an axial end surface of the stator core. The portions that project from the axial end surface of the stator core serve as coil end portions that are not used in formation of a magnetic circuit, and are therefore wasteful portions that do not affect output characteristics.

For example, in an IPM (interior permanent magnet) motor described in Japanese Patent Application Publication No. JP-A-2008-148482, a portion of a lead wire of a coil end portion gradually increases in diameter from an end surface of a stator core so as to be positioned on an outer peripheral side of an outer peripheral side bottom portion of a slot in the stator core. To achieve this, in Japanese Patent Application Publication No. JP-A-2008-148482, the axial end surface of the stator core must be positioned further toward an axial inner side than a position at which the lead wire begins to increase in diameter, leading to a reduction in the axial length of the stator core and a reduction in the volume of the stator core for forming a magnetic circuit. Therefore, to improve the output characteristics, the axial length of the stator must be increased.

In an alternating current motor according to Japanese Patent Application Publication No. JP-A-2004-159476, for example, an auxiliary core formed by stacking electromagnetic steel plates is added to a tip end portion and an outer peripheral portion of the teeth of a stator core such that the length of a rotor is increased by an amount corresponding to the added auxiliary cores. By adding the auxiliary cores to the coil end portions, which are wasteful regions that do not affect the output characteristics, torque generated by the motor is increased without increasing the length of a winding.

However, Japanese Patent Application Publication No. JP-A-2004-159476 describes a technique relating to a stator formed by winding armature windings around the tooth portions of the stator core in a so-called concentrated winding condition. Therefore, even though the auxiliary cores are provided on the inner peripheral portion and outer peripheral portion of the coil end portion, the auxiliary cores are not provided on the tooth portions. Hence, it is impossible to supply sufficient magnetic flux to the rotor in the portions provided with the auxiliary cores, and as a result, the output characteristics cannot be sufficiently improved.

Further, in a stator for a rotating electric machine according to Japanese Patent Application Publication No. JP-A-2003-199267, for example, a step-cut portion is formed in a stator core in a circumferential position where a current phase of a coil on an inner diameter side axial end portion of the stator core varies. In so doing, a large temperature increase based on eddy current loss is reduced, leading to a reduction in a maximum value of a temperature increase distributed in the circumferential direction.

However, the technique described in Japanese Patent Application Publication No. JP-A-2003-199267 is only intended to reduce large temperature increases based on eddy current loss, but not intended to improve the output characteristics of a motor or the like formed by a stator core. Therefore, the output characteristics cannot be improved by the technique described in Japanese Patent Application Publication No. JP-A-2003-199267.

SUMMARY

The present invention has been designed in consideration of the problems of related art described above, and it is an object of the present invention to provide a stator and a rotating electric machine employing the stator with which output characteristics can be improved while preventing an increase in the size of the stator.

The present invention relates to a stator in which coil conductors of three phases are disposed in a plurality of slots provided in a stator core. The stator is characterized in that the coil conductors are formed by connecting a plurality of slot conductor portions disposed in the slot, a plurality of coil end conductor portions extending in a circumferential direction of the stator core on an outer side of an axial end surface of the stator core, and a plurality of upstanding conductor portions, each of which connects the coil end conductor portion and the slot conductor portion, the plurality of slot conductor portions and the plurality of upstanding conductor portions are disposed in series in a radial direction of the stator core, at least the upstanding conductor portion positioned on an outermost peripheral side is formed in an inclined shape that steadily increases in diameter toward the outer peripheral side while approaching an axial outer side of the stator core, the stator core is formed by connecting a main core portion formed with a main slot portion for disposing the slot conductor portion and an auxiliary core portion formed with an auxiliary slot portion for disposing the upstanding conductor portion, and an outer peripheral side bottom portion of the auxiliary slot portion in the auxiliary core portion is formed in a stepped shape or an inclined shape that corresponds to the inclined shape of the upstanding conductor portion positioned on the outermost peripheral side.

In the stator according to the present invention, the shape of the stator core is modified.

More specifically, in the stator core according to the present invention, the auxiliary core portion is connected to the main core portion such that the stator core is formed not only in a portion opposing the slot conductor portion but also in a portion opposing the upstanding conductor portion. Hence, when the stator according to the present invention is used, a magnetic circuit can also be formed in a position opposing the upstanding conductor portion.

Further, the auxiliary slot portion of the auxiliary core portion is formed in a stepped shape or an inclined shape that corresponds to the inclined shape of the upstanding conductor portion positioned on the outermost peripheral side (the outer peripheral side of the stator core). As a result, a radial direction width of a yoke portion positioned on the outer peripheral side of the auxiliary slot portion can be maximized while avoiding interference with the upstanding conductor portion. Hence, when the stator is used, a region in which the magnetic circuit is formed can be enlarged.

Furthermore, the auxiliary core portion is provided in accordance with the formation position of the upstanding conductor portion, and therefore an increase in the overall size of the stator due to disposal of the auxiliary core portion can be prevented.

Hence, with the stator according to the present invention, output characteristics of a rotating electric machine employing the stator can be improved while preventing an increase in the size of the stator.

A second invention relates to a stator in which coil conductors of three phases are disposed in a plurality of slots provided in a stator core. The stator is characterized in that an outer peripheral side bottom portion of the slot is formed in a stepped shape or an inclined shape such that a portion of the outer peripheral side bottom portion on at least one axial outer side of the stator core increases steadily in diameter toward an outer peripheral side as the portion approaches the axial outer side of the stator core, and a remaining portion of the outer peripheral side bottom portion is formed parallel to the axial direction of the stator core, the plurality of coil conductors are disposed in the slot in series in a radial direction of the stator core, and a portion of the coil conductor that is disposed in the slot and positioned on at least an outermost peripheral side is formed in a shape that corresponds to the shape of the outer peripheral side bottom portion of the slot.

In the stator core according to this invention also, the shape of the stator core is modified.

More specifically, a portion of the outer peripheral side bottom portion of the slot provided in the stator core according to this invention on at least one axial outer side of the stator core is formed in a stepped shape or an inclined shape, and at least the portion of the coil conductor disposed on the outermost peripheral side is formed in a shape that corresponds to the shape of the outer peripheral side bottom portion. Thus, the stator core can also be disposed in the portion of the coil conductor corresponding to the upstanding conductor portion that is bent toward the outer peripheral side of the radial direction in order to form the coil end portion. As a result, an increase in the overall size of the stator can be prevented, and when the stator is used, the region in which the magnetic circuit is formed can be enlarged further.

Therefore, with the stator according to this invention, the output characteristics of the rotating electric machine employing the stator can be improved while preventing an increase in the size of the stator.

A third invention relates to a rotating electric machine employing the stator described above. The rotating electric machine is characterized in that a rotor that is rotatably disposed opposing the stator is formed with a length that corresponds to a length of the main core portion and the auxiliary core portion when connected.

In the rotating electric machine according to this invention, the rotor is also formed in a portion opposing the auxiliary core portion. As a result, the magnetic circuit formed when the rotating electric machine is used can be formed more powerfully.

Therefore, with the rotating electric machine employing the stator according to the present invention, the output characteristics of the rotating electric machine can be improved while preventing an increase in the size of the stator.

BRIEF DESCRIPTION OF THE DRAWINGS

FIG. 13 is an illustrative sectional view showing an enlargement of a state in which the plurality of divided cores constituting the auxiliary core portion are crimped by the sleeve, according to the first embodiment;

FIG. 14 is an illustrative side view showing an annular auxiliary insulating paper according to the first embodiment;

FIG. 23 is an illustrative plan view showing formation of the insulating paper according to the second embodiment;

DETAILED DESCRIPTION OF EMBODIMENTS

Figure 1:
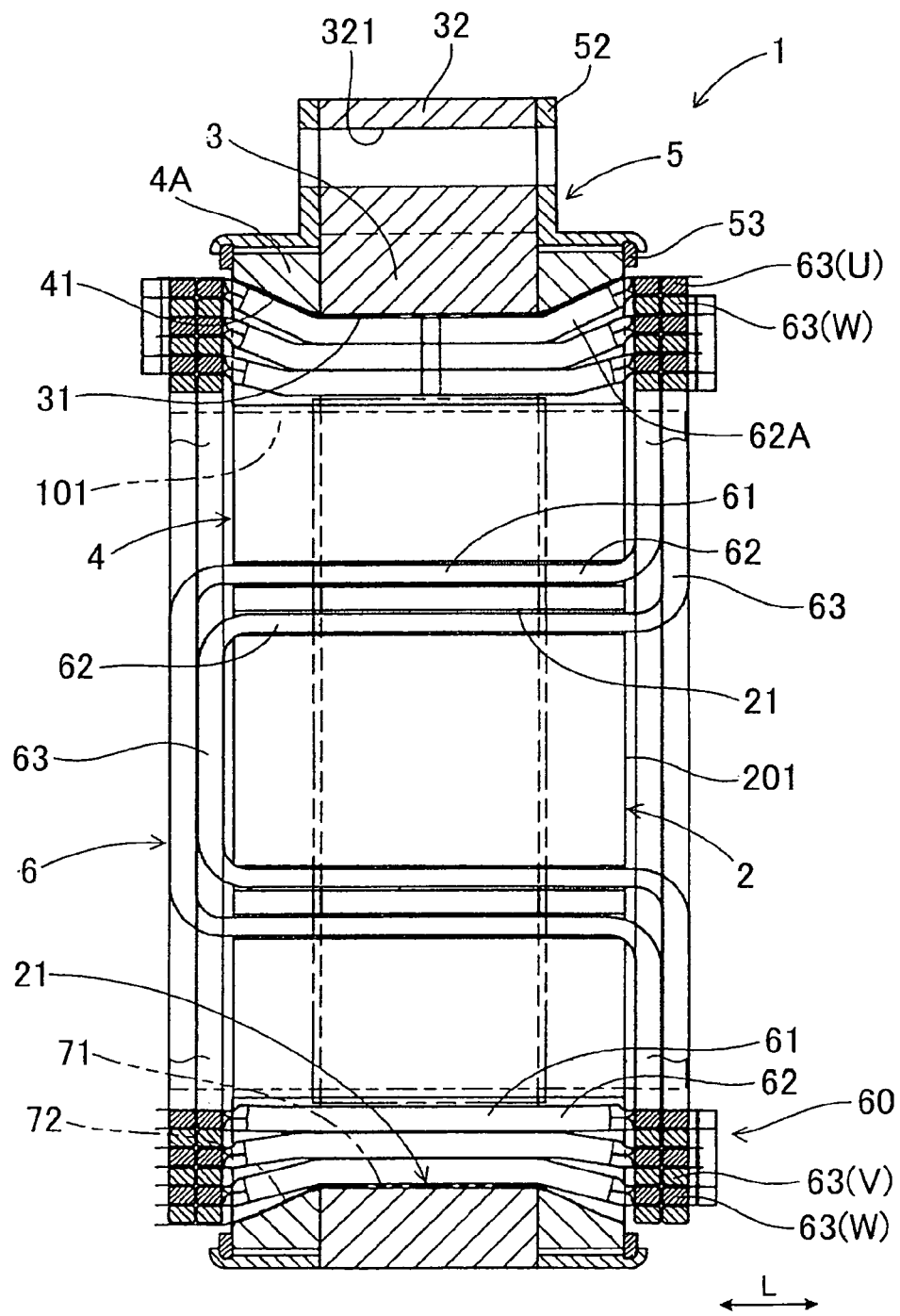
FIG. 1 is an illustrative sectional view showing a stator according to a first embodiment.

Preferred embodiments of the first to third inventions described above will now be described.

The stator according to the first to third inventions may be used as a stator for a rotating electric machine such as a motor, a generator, or a motor/generator.

The stator may be an inner rotor type stator in which a rotor is disposed and used on an inner peripheral side of the stator.

The upstanding conductor portion is a portion that projects from an axial end surface of the stator core (main core portion) and is bent toward the outer peripheral side of a stator core so that the coil end conductor portions can be disposed collectively on the outside of the axial end surface.

The plurality of upstanding conductor portions arranged in the radial direction of the stator core may be formed such that an angle of incline of an upstanding conductor portion positioned on the outer peripheral side is larger than the angle of incline of an upstanding conductor portion positioned on the inner peripheral side. Further, the angle of incline of the upstanding conductor portion positioned on the innermost peripheral side may be set at substantially 0°.

In the first invention, the main core portion may be formed by stacking a plurality of electromagnetic steel plates in the axial direction of the stator core, the auxiliary core portion may be formed by stacking core blocks, each of which is formed by stacking a plurality of electromagnetic steel plates in the axial direction of the stator core, into a plurality of steps in the axial direction of the stator core, and the auxiliary slot portion may be formed by setting a radial dimension of a slot groove formed from an inner peripheral side of the core block may be set to be larger in the core block positioned on the axial outer side of the stator core than in the core block positioned on an axial center side of the stator core.

In this case, the auxiliary slot portion of the auxiliary core portion need not be inclined, and therefore the auxiliary slot portion of the auxiliary core portion can be formed easily by stacking the core blocks into a plurality of steps.

Note that the axial center side of the stator core denotes the side of the stator core closest to the center of the axial direction, and the axial outer side of the stator core denotes the side of the stator core farthest from the center of the axial direction.

Further, the main core portion is preferably formed by stacking a plurality of electromagnetic steel plates in the axial direction of the stator core, and the auxiliary core portion is preferably formed by compression-molding a soft magnetic powder.

In this case, the auxiliary slot portion of the auxiliary core portion can be formed into an inclined shape easily.

Further, the main core portion is preferably formed as an integral core having an annular shape, while the auxiliary core portion is preferably formed by combining a plurality of divided cores divided in a plurality of locations in the circumferential direction of the stator core, and the auxiliary core portion is preferably fitted into an annular sleeve for holding the plurality of divided cores in a combined state.

In this case, the circularity of the stator can be maintained at a high level of precision by the main core portion formed as an integral core. Moreover, by dividing the auxiliary core portion into the plurality of divided cores, the respective divided cores can be disposed relative to the upstanding conductor portion of the coil conductor easily from the outer peripheral side. As a result, the stator can be assembled easily.

Further, a main insulating paper may be disposed in each main slot portion of the main core portion to provide insulation between the main core portion and the slot conductor portion, and an auxiliary insulating paper may be disposed in the auxiliary slot portion of each divided core in the auxiliary core portion to provide insulation between all of the auxiliary slot portions in the divided cores and the upstanding conductor portion.

In this case, by dividing an insulating paper for providing insulation between the stator core and the coil conductor into the main insulating paper and the auxiliary insulating paper, the main insulating paper can be disposed relative to the main slot portion of the main core portion easily and the auxiliary insulating paper can be disposed relative to the auxiliary slot portions of the respective divided cores constituting the auxiliary core portion easily. As a result, the stator can be assembled easily.

Note that the main insulating paper and the auxiliary insulating paper may be constituted by various types of insulating paper, for example a resin film material, a paper material, and so on. Furthermore, the insulating paper may be formed by coating the surface of a resin material with a paper material.

Further, the main core portion and the auxiliary core portion may be formed integrally in the axial direction by combining a plurality of divided cores divided in a plurality of locations in the circumferential direction of the stator core, and the main core portion and the auxiliary core portion may be fitted into an annular sleeve for holding the plurality of divided cores in a combined state.

In this case, by integrating the main core portion and auxiliary core portion and then dividing them into a plurality of divided cores, the coil conductor can be formed in a state for forming the stator, and the respective divided cores can be disposed relative to the coil conductor easily from the outer peripheral side. As a result, the stator can be assembled easily.

Note that when the auxiliary core portion is formed by stacking the core blocks into a plurality of steps, the divided cores of the auxiliary core portion may be formed by stacking the core blocks, the auxiliary core portion may then be connected integrally to the divided cores of the main core portion, and the respective integrated divided cores may be disposed from the outer peripheral side of the coil conductor disposed in a state for forming the stator.

Further, an insulating paper for providing insulation between the main core portion and the slot conductor portion and between the auxiliary core portion and the coil end conductor portion may be disposed continuously on the slot conductor portion and the upstanding conductor portion disposed in each slot.

In this case, the insulating paper may be disposed on the respective slot conductor portions and the respective upstanding conductor portions of the coil conductors, and the respective divided cores are attached to the coil conductors provided with the insulating paper from the outer peripheral side.

Further, the insulating paper is preferably disposed in each slot so as to envelop all of the slot conductor portions and upstanding conductor portions disposed in the respective slots collectively from the inner peripheral side of the stator core, and such that end portions of the insulating paper overlap on the outer peripheral side.

In this case, the portion of the insulating paper in which end portions thereof overlap with each other are not positioned on the inner peripheral side of each slot, and therefore an insulating material such as a wedge need not be disposed on the inner peripheral side of each slot.

Note that the inner peripheral side of the stator core denotes the side of the stator core closest to the center of the radial direction, and the outer peripheral side of the stator core denotes the side of the stator core farthest from the center of the radial direction.

Further, the slot may a parallel slot having circumferential direction side faces that are parallel to each other in the radial direction of the stator core, the parallel slot may be formed in a multiple of two, and the plurality of divided cores may be segmented at a yoke portion positioned on an outer peripheral side of a pair of slots sandwiching a single slot.

In this case, the number of divisions of the divided cores can be reduced, and by disposing the slot sandwiched between the pair of slots relative to the upstanding conductor portion of the coil conductor in the radial direction from the outer peripheral side, the divided cores can be attached from the outer peripheral side easily.

Further, the coil conductor is preferably formed from an angular wire having a substantially square cross section and disposed in the slot in a distributed winding condition such that in the coil end conductor portion, the coil conductor overlaps a coil conductor of another phase in the radial direction, at least a portion of the coil end conductor portion is preferably disposed further toward a radial outer side than the slot conductor portion, and at least the upstanding conductor portion positioned on the outermost peripheral side is preferably formed in an inclined shape that increases in diameter toward the outer peripheral side while approaching the axial outer side of the stator core.

In this case, the upstanding conductor portion of the coil conductor can be formed in an inclined shape easily, and the area of each slot occupied by the coil conductor can be increased easily.

Further, the coil conductor preferably takes a wave winding coil shape in which the coil end conductor portion is connected to the slot conductor portion and the upstanding conductor portion alternately on one axial end side and another axial end side of the stator core.

In this case, the coil conductor disposed in the stator core in a distributed winding condition can be formed easily.

Further, the coil conductor may be constituted by coil conductors of three phases, namely a U phase, a V phase and a W phase, in the stator core, U phase, V phase and W phase slots may be formed in adjacent pluralities and disposed repeatedly in a fixed arrangement sequence; the plurality of slot conductor portions and the plurality of upstanding conductor portions of the coil conductor of each phase may be disposed in the slot of each phase in series in the radial direction of the stator core; the plurality of coil end conductor portions of coil conductors of the same phase drawn from adjacent slots of the same phase may be disposed on the outer side of the axial end surface of the stator core in series in the axial direction of the stator core; a U phase coil end conductor portion and a V phase coil end conductor portion, a V phase coil end conductor portion and a W phase coil end conductor portion, or a W phase coil end conductor portion and a U phase coil end conductor portion may be disposed so as to overlap alternately in the radial direction of the stator core in each portion of the circumferential direction of the stator core; and the auxiliary slot portion of the auxiliary core portion may be formed in a stepped shape or an inclined shape that corresponds to the inclined shape of the upstanding conductor portion positioned on the outermost peripheral side.

In this case, a three-phase rotating electric machine having improved output characteristics can be formed by a stator formed using coil conductors of three phases.

Further, the coil end conductor portion preferably has a cross-sectional shape that is thinner in the radial direction of the stator core than in the axial direction of the stator core.

In this case, by reducing the thickness of the coil end conductor portion in the radial direction, an angle of incline of the upstanding conductor portion (the angle of incline of the stator core relative to the axial direction) can be reduced. As a result, a radial direction length (sectional area) of the yoke portion positioned on the outer peripheral side of the auxiliary slot portion can be increased, leading to an improvement in the output characteristics of the rotating electric machine employing the stator.

Embodiments

Embodiments of a stator and a rotating electric machine employing the stator according to the present invention will be described below with reference to the drawings.

First Embodiment

Figure 2:
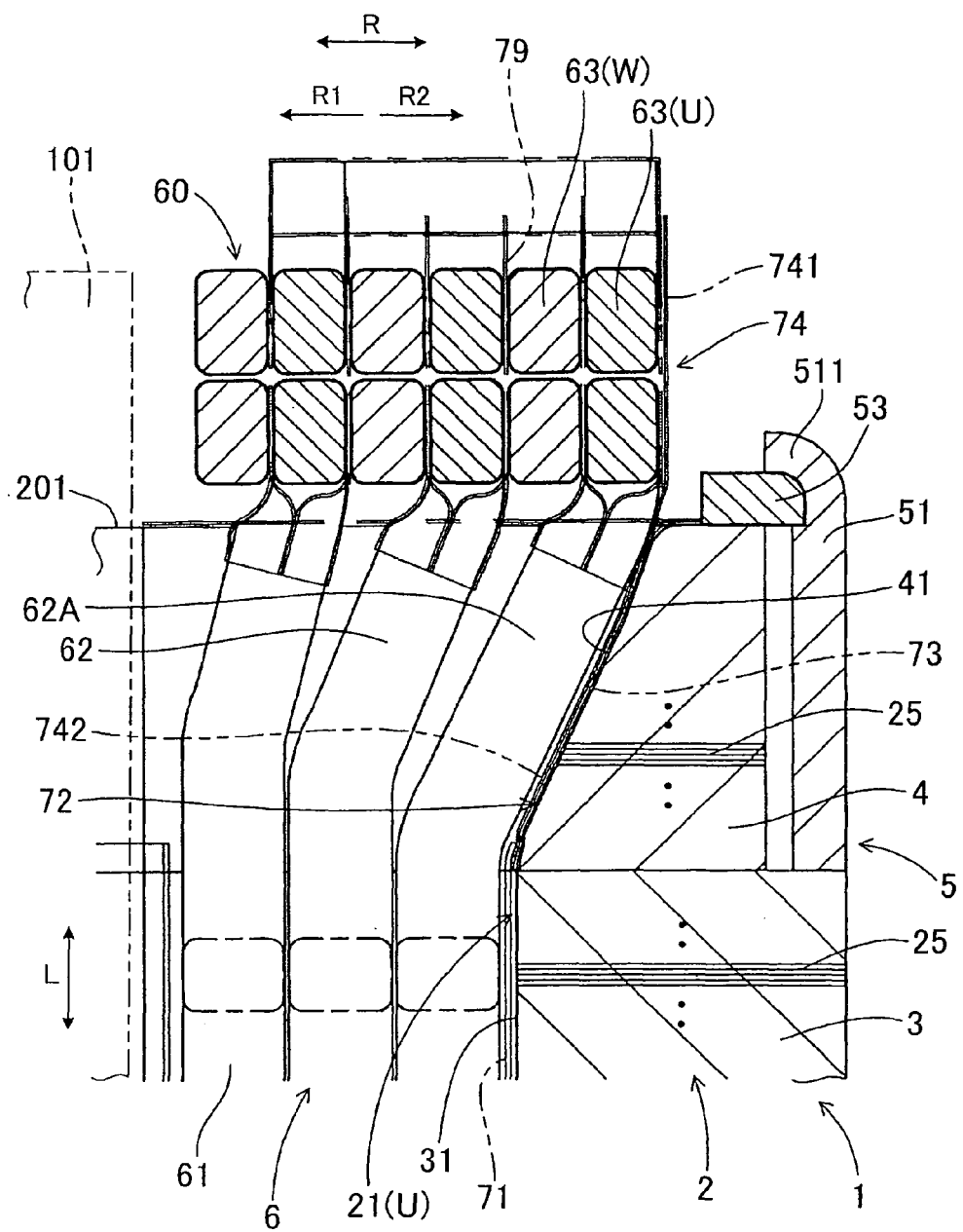
FIG. 2 is an illustrative sectional view showing an enlargement of the periphery of a coil end portion according to the first embodiment.
Figure 3:
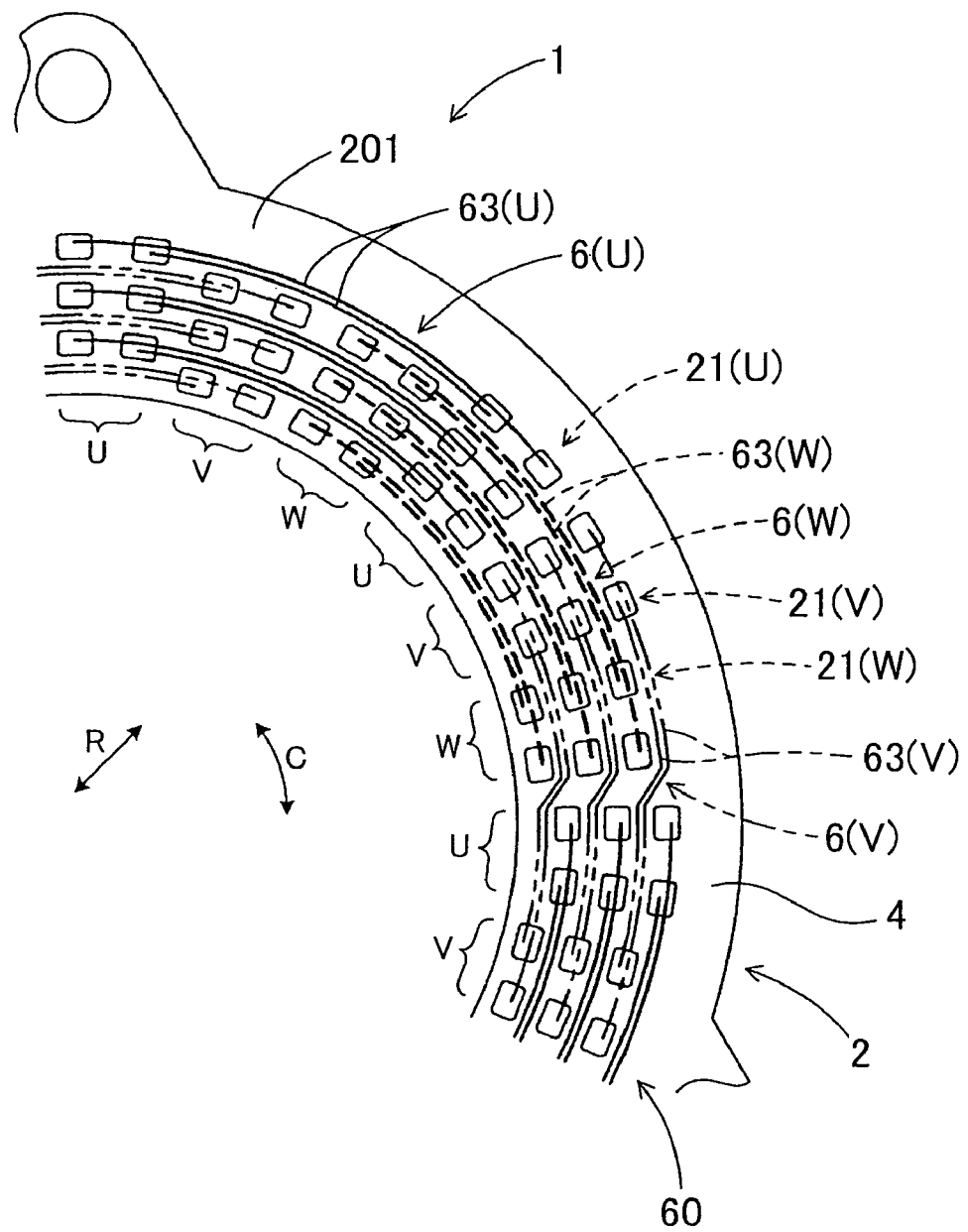
FIG. 3 is an illustrative plan view showing in pattern form the periphery of the coil end portion according to the first embodiment.

As shown in FIGS. 1 to 3, a stator 1 according to this embodiment is formed by disposing coil conductors 6 of three phases in a distributed winding condition in a plurality of slots 21 provided in a stator core 2. The coil conductors 6 are formed by connecting pluralities of a slot conductor portion 61 disposed in the slot 21 in a parallel condition to an axial direction L of the stator core 2, a coil end conductor portion 63 disposed in a circumferential direction C of the stator core 2 on the outside of an axial end surface 201 of the stator core 2, and an upstanding conductor portion 62 that connects the coil end conductor portion 63 and the slot conductor portion 61. The slot conductor portion 61 and the upstanding conductor portion 62 are arranged in a plurality in a radial direction R of the stator core 2.

As shown in FIG. 1, at least an upstanding conductor portion 62A positioned on an outermost peripheral side R2 is formed in an inclined shape so as to increase in diameter toward the outer peripheral side R2 (the outside of the radial direction R of the stator core 2) as it approaches the outside of the axial direction L of the stator core 2. The stator core 2 is formed by connecting a main core portion 3 formed with a main slot portion 31 in which the slot conductor portion 61 is disposed and an auxiliary core portion 4 formed with an auxiliary slot portion 41 in which the upstanding conductor portion 62 is disposed. As shown in FIG. 2, an outer peripheral side bottom portion of the auxiliary slot portion 41 of the auxiliary core portion 4 is formed in an inclined shape that corresponds to the inclined shape of the upstanding conductor portion 62A disposed on the outermost peripheral side R2.

The stator 1 and a rotating electric machine employing the stator 1 according to this embodiment will now be described in detail with reference to FIGS. 1 to 14.

The stator 1 according to this embodiment is used in a three-phase alternating current motor, a generator, a motor/generator, or similar employed in a hybrid car, an electric automobile, and so on. Further, as shown in FIGS. 1 and 2, the stator 1 according to this embodiment is an inner rotor type stator 1 in which a rotor 101 is disposed and used on an inner peripheral side R1 thereof.

Figure 4:
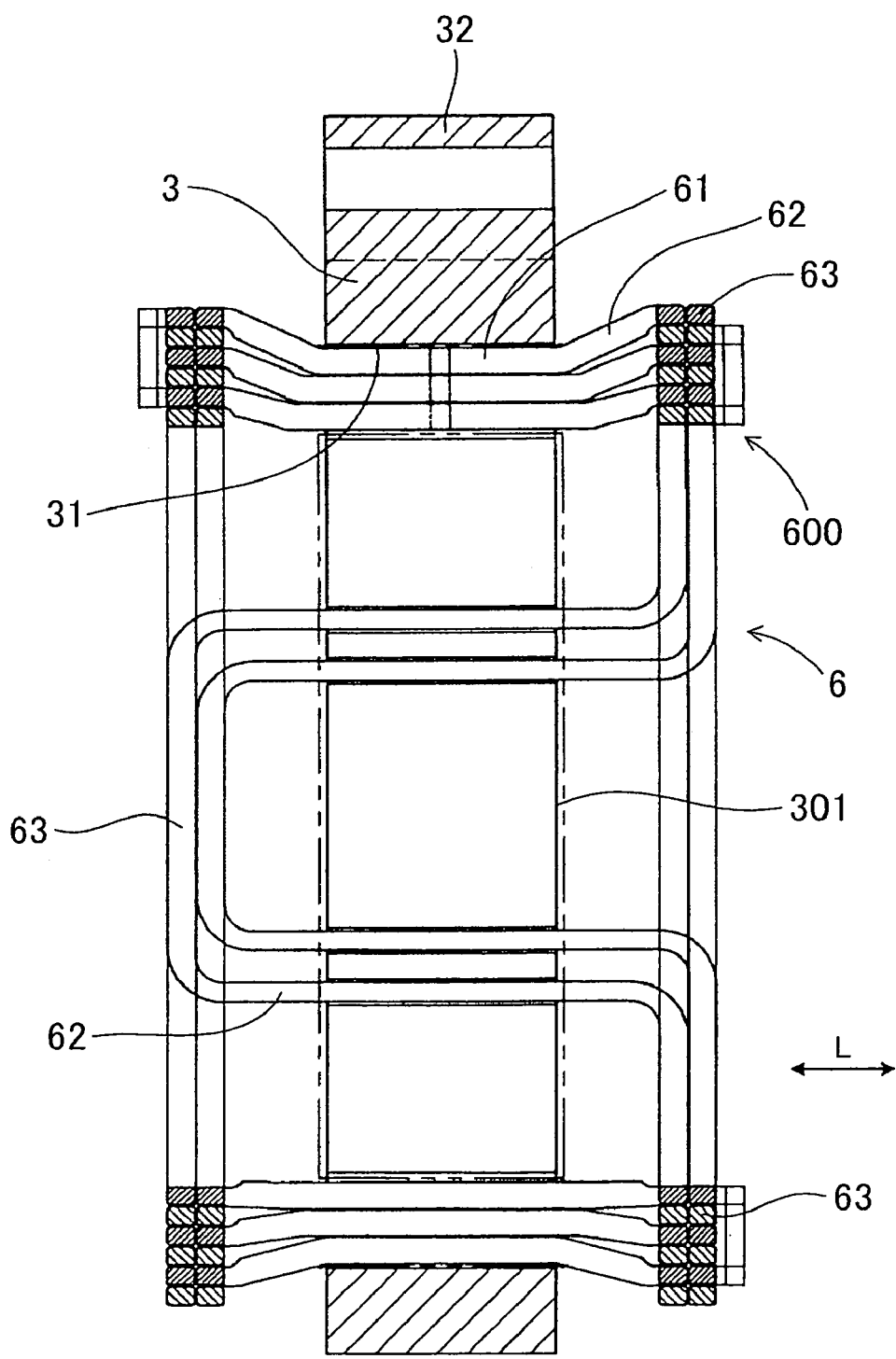
FIG. 4 is an illustrative sectional view showing a state in which a coil conductor is disposed in a main core portion, according to the first embodiment.
Figure 6:
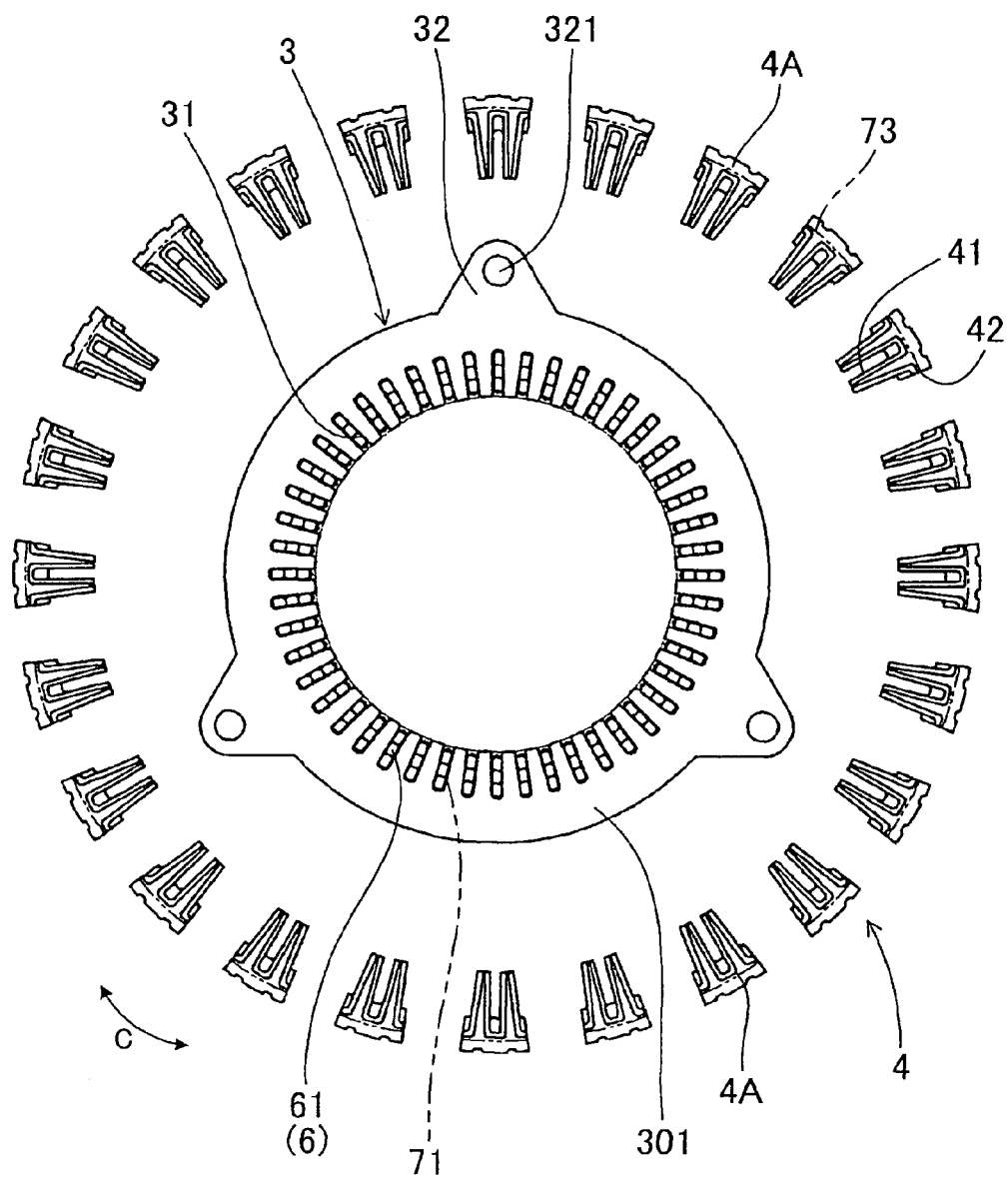
FIG. 6 is an illustrative plan view showing a state in which a plurality of divided cores constituting an auxiliary core portion are disposed relative to the main core portion, according to the first embodiment.

As shown in FIG. 2, the stator core 2 according to this embodiment is formed by stacking a plurality of electromagnetic steel plates 25 having an insulating film on a surface thereof in the axial direction L. As shown in FIGS. 4 and 6, the main core portion 3 according to this embodiment is formed as an integral core having an annular shape by stacking a plurality of electromagnetic steel plates 25 having an insulating film on a surface thereof. The auxiliary core portion 4 according to this embodiment is formed by stacking a plurality of electromagnetic steel plates 25 having an insulating film on a surface thereof, and is divided into a plurality of divided cores 4A by being segmented at a yoke portion (back yoke) 42 positioned on the outer peripheral side R2 of the auxiliary slot portion 41 (see FIG. 12). An attachment portion 32 that projects toward the outer peripheral side R2 (the outside of the radial direction R) and is used to attach the stator 1 to a peripheral disposal portion is formed in the integral main core portion 3 in a plurality of locations in the circumferential direction C, and an attachment hole 321 is formed in the attachment portion 32 in the axial direction L.

Note that the auxiliary core portion 4 may be formed by compression-molding a soft magnetic powder (microparticles) via a binder instead of using the electromagnetic steel plates 25.

Figure 9:
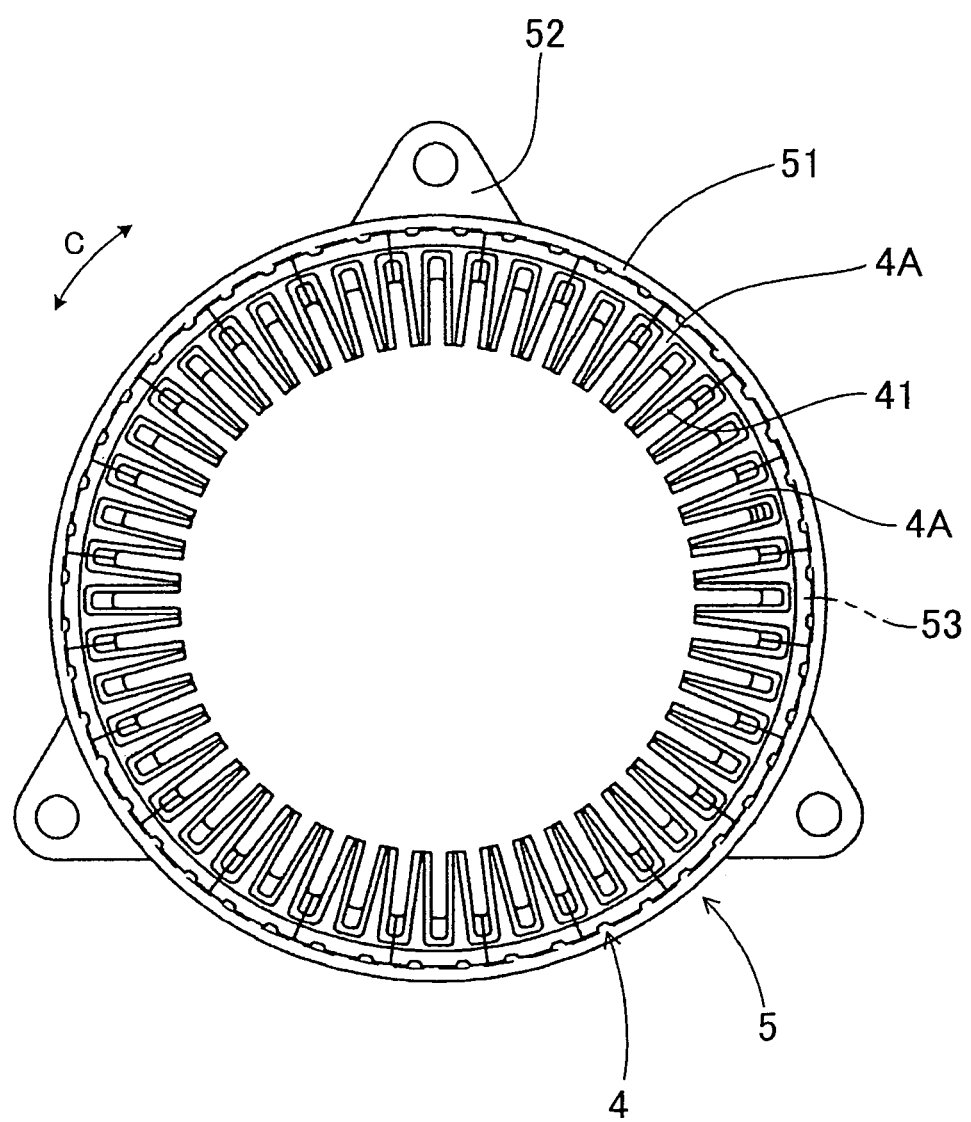
FIG. 9 is an illustrative plan view showing a state in which the plurality of divided cores constituting the auxiliary core portion are crimped by a sleeve, according to the first embodiment.

As shown in FIGS. 1, 2 and 9, the plurality of divided cores 4A constituting the respective auxiliary core portions 4 are fitted into an annular sleeve 5 in a combined state. The sleeve 5 is formed by causing a sleeve attachment portion 52 disposed opposite an axial end surface of the attachment portion 32 to project toward the outer peripheral side R2 (the outside of the radial direction R) from an axial end portion 511 of an annular main body portion 51.

Figure 10:
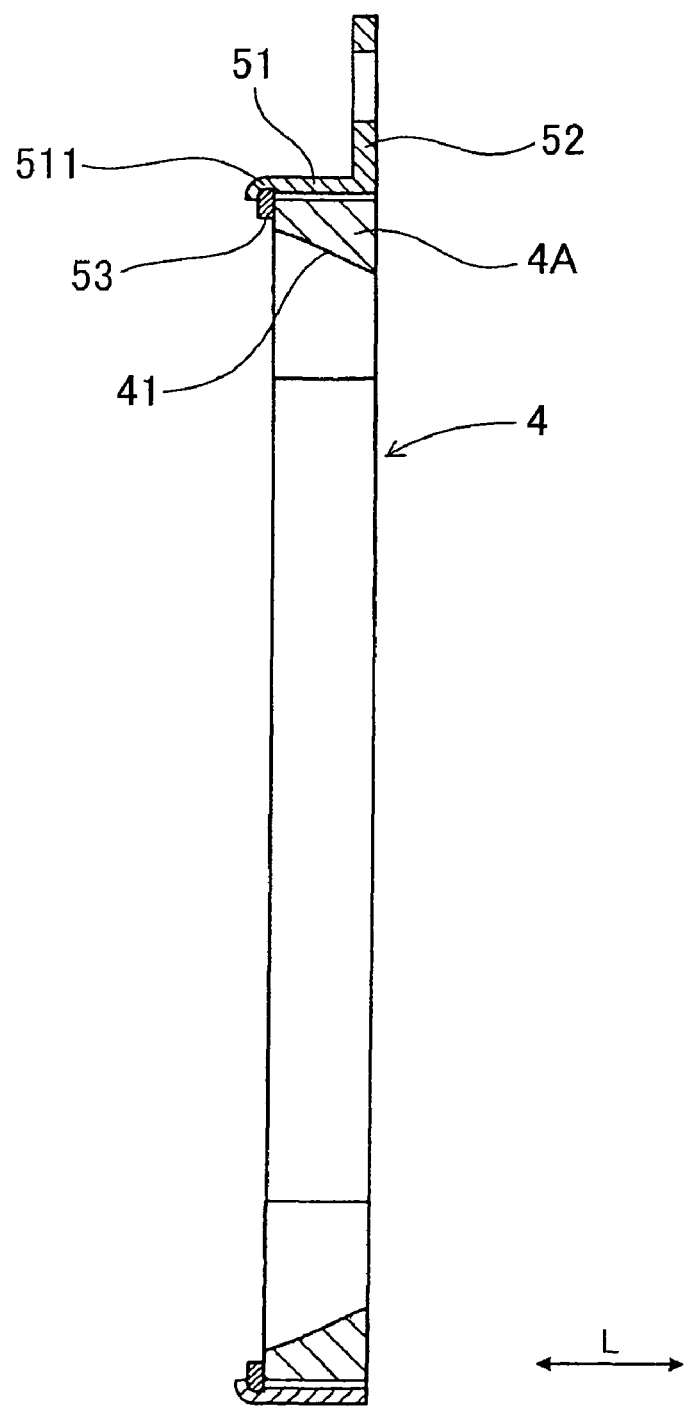
FIG. 10 is an illustrative sectional view showing a state in which the plurality of divided cores constituting the auxiliary core portion are crimped by the sleeve, according to the first embodiment.

Further, as shown in FIGS. 9 and 10, the sleeve 5 is capable of holding the plurality of divided cores 4A in a combined state by attaching the main body portion 51 to the outer periphery of the auxiliary core portion 4 constituted by the combined plurality of divided cores 4A and fastening the axial end portion 511 of the main body portion 51 to the axial end surface 201 of the auxiliary core portion 4 via a crimping ring 53. Further, as shown in FIG. 1, the attachment portion 32 is sandwiched between the sleeve attachment portions 52 such that the respective auxiliary core portions 4 are connected to the main core portion 3 by the sleeve 5.

Figure 8:
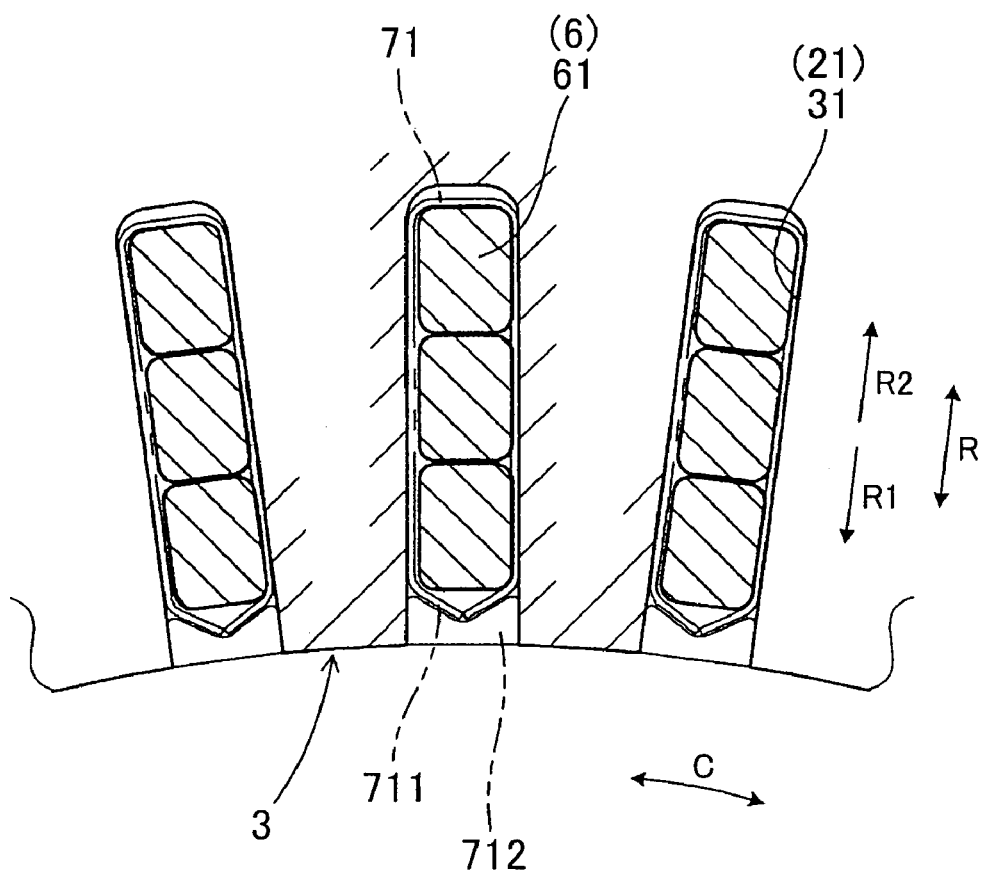
FIG. 8 is an illustrative sectional view showing the main core portion in which a slot conductor portion of the coil conductor is disposed, according to the first embodiment.
Figure 12:
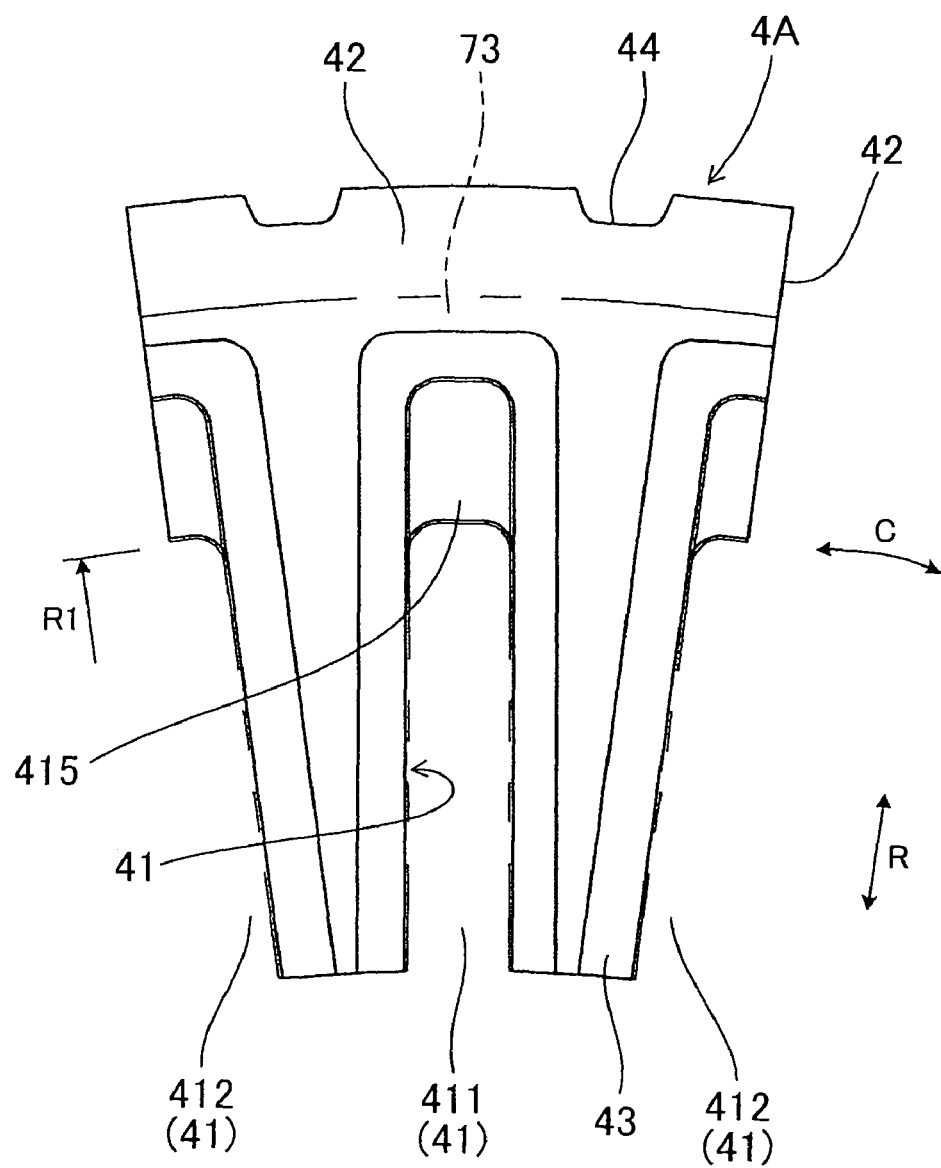
FIG. 12 is an illustrative plan view showing a state in which the divided auxiliary insulating paper is disposed on the divided core constituting the auxiliary core portion, according to the first embodiment.

As shown in FIGS. 8 and 12, the respective slots 21 (the main slot portion 31 and the auxiliary slot portion 41) of the stator core 2 according to this embodiment are formed as a parallel slot that have side faces in the circumferential direction C and are parallel to each other in the radial direction R of the stator core 2. The slots 21 are formed in a multiple of two, and in the stator core 2 according to this embodiment, eight coil conductors 6U, 6V, 6W of each of three phases are dispersed in the circumferential direction C of the stator core 2 according to this embodiment, and therefore 48 slots 21 are formed (see FIGS. 6 and 9).

Further, as shown in FIGS. 6 and 12, the plurality of divided cores 4A constituting the auxiliary core portion 4 are segmented at the yoke portions 42 positioned on the outer peripheral side R2 of a pair of auxiliary slot portions 41 sandwiching a single auxiliary slot portion 41, and in this embodiment, 24 divided cores 4A are formed. An auxiliary slot portion 41 segmented into halves is formed on either side of a single auxiliary slot portion 41 in each divided core 4A. Further, an irregular shape 44 is formed on the outer peripheral surface of each divided core 4A, and by fitting the irregular shape 44 into an irregular shape formed on an inner peripheral surface of the sleeve 5, the respective divided cores 4A are positioned in the circumferential direction C. Note that teeth 43 are formed between the auxiliary slot portions 41 (the slots 21).

Figure 7:
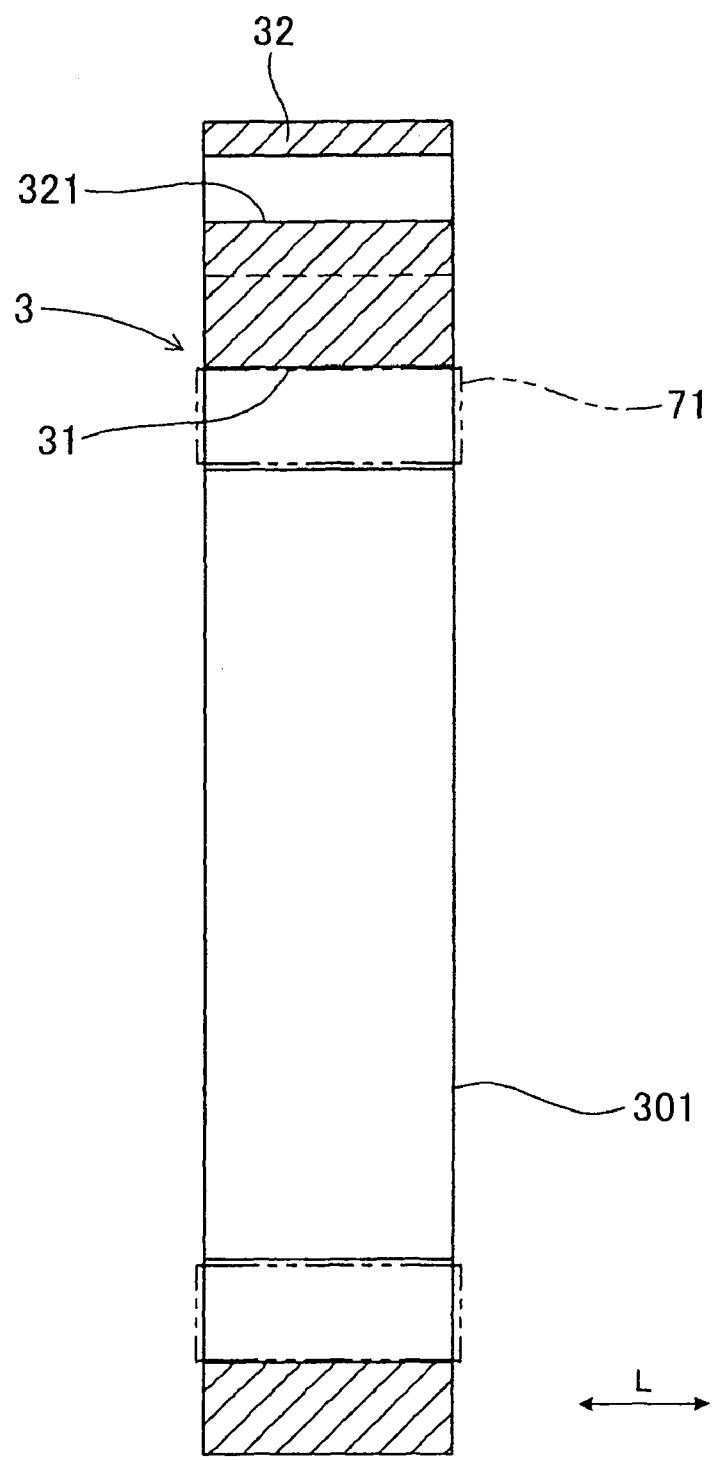
FIG. 7 is an illustrative sectional view showing the main core portion according to the first embodiment.

Further, as shown in FIGS. 7 and 8, a main insulating paper 71 for providing insulation between the main core portion 3 and the slot conductor portion 61 is disposed in each main slot portion 31 of the main core portion 3. An end portion 711 of the main insulating paper 71 is disposed toward the inner peripheral side R1 of the main slot portion 31 (the slot 21). Further, a wedge 712 serving as an insulating material is disposed on the inner peripheral side R1 of the main slot portion 31 opposite the end portion 711 of the main insulating paper 71.

Further, as shown in FIG. 2, an auxiliary insulating paper 72 for providing insulation between the auxiliary slot portion 41 and the upstanding conductor portion 62 is disposed in all of the auxiliary slot portions 41 of the respective divided cores 4A of the auxiliary core portion 4. The auxiliary insulating paper 72 is constituted by a divided auxiliary insulating paper 73 disposed in each divided core 4A, and an annular auxiliary insulating paper 74 disposed singly in the auxiliary core portion 4 formed by combining the plurality of divided cores 4A.

Figure 11:
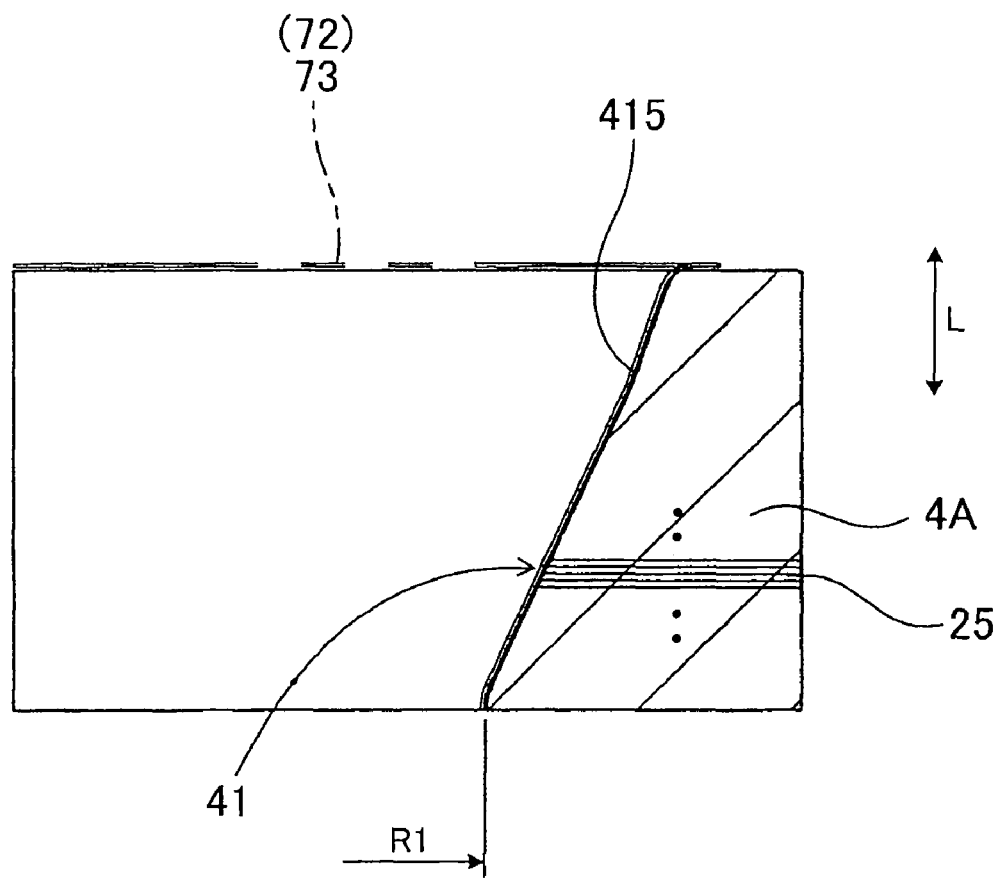
FIG. 11 is an illustrative sectional view showing a state in which a divided auxiliary insulating paper is disposed on the divided core constituting the auxiliary core portion, according to the first embodiment.

As shown in FIGS. 11 and 12, the divided auxiliary insulating paper 73 is formed such that a portion thereof is disposed in a central slot 411 formed in a central position in the circumferential direction C of the divided core 4A and another portion thereof is disposed in a pair of segmented slots 412 segmented into halves and positioned on either side of the central slot 411 in the circumferential direction C. Further, the divided auxiliary insulating paper 73 is formed in a three-dimensional shape so as to be able to cover the surface of the divided core 4A. As shown in FIG. 14, the annular auxiliary insulating paper 74 includes an annular main body portion 741 covering the outermost peripheral side R2 of the plurality of coil end conductor portions 63, and a seam portion 742 formed so as to project from the annular main body portion 741 in the formation locations of the segmented slots 412. The seam portion 742 is disposed on the surface of the portion of the divided auxiliary insulating paper 73 that is disposed in the segmented slots 412 of each divided core 4A.

As shown in FIGS. 2 and 8, the coil conductor 6 according to this embodiment is formed from angular wire having a substantially square cross section in order to increase the area of the slot 2 occupied thereby. The plurality of (three in this embodiment) slot conductor portions 61 of the coil conductor 6 are arranged in the radial direction R within the slot 21.

As shown in FIG. 3, the coil conductor 6 according to this embodiment is constituted by coil conductors 6U, 6V, 6W of three phases, namely a U phase, a V phase and a W phase. Further, the coil conductors 6 according to this embodiment are formed in a wave winding coil shape such that the coil end conductor portions 63 are connected to the slot conductor portion 61 and the upstanding conductor portion 62 alternately on one end side and another end side of the axial direction L of the stator core 2.

In the stator core 2 according to this embodiment, slots 21U, 21V, 21W of each of the U phase, the V phase and the W phase are formed such that a plurality of (two in this embodiment) slots 21 of the same phase are disposed adjacent to each other and this pattern is repeated in a fixed arrangement sequence (for example, in order of the U phase, the V phase, and the W phase).

The slot conductor portion 61 and the upstanding conductor portion 62 of the coil conductors 6U, 6V, 6W of each phase are arranged in pluralities in the radial direction R of the stator core 2 in the slots 21U, 21V, 21W of each phase (the main slot portion 31 and the auxiliary slot portion 41).

Note that the upstanding conductor portion 62 is a portion that projects from an axial end surface 301 of the main core portion 3 and is bent toward the outer peripheral side R2 (the outside of the radial direction R) so that the coil end conductor portions 63 are arranged in the radial direction R on the outside of the axial end surface 301. Further, the upstanding conductor portion 62 bent toward the outer peripheral side R2 is disposed further toward the outer peripheral side R2 than the slot conductor portion 61.

As shown in FIG. 2, a plurality of (two in this embodiment) coil end conductor portions 63 of coil conductors 6 of the same phase drawn from adjacent slots 21 of the same phase are disposed in series in the axial direction L of the stator core 2 on the outside of the axial end surface 201 of the stator core 2.

Further, as shown in FIG. 3, the U phase coil end conductor portion 63U and the V phase coil end conductor portion 63V, the V phase coil end conductor portion 63V and the W phase coil end conductor portion 63W, or the W phase coil end conductor portion 63W and the U phase coil end conductor portion 63U are disposed so as to overlap alternately in the radial direction R of the stator core 2 in each portion of the circumferential direction C of the stator core 2. In the coil end portion 60 formed by the coil end conductor portions 63 of the three phases of this embodiment, the U phase, V phase and W phase coil end conductor portions 63U, 63V, 63W are arranged in twos in the axial direction L.

Further, a portion in which two U phase coil end conductor portions 63U arranged in the axial direction L and two V phase coil end conductor portions 63V arranged in the axial direction L overlap alternately in the radial direction R, a portion in which two V phase coil end conductor portions 63V arranged in the axial direction L and two W phase coil end conductor portions 63W arranged in the axial direction L overlap alternately in the radial direction R, and a portion in which two W phase coil end conductor portions 63W arranged in the axial direction L and two U phase coil end conductor portions 63U arranged in the axial direction L overlap alternately in the radial direction R are formed in each portion of the circumferential direction C of the stator core 2.

FIG. 1 shows the slot conductor portion 61 and the upstanding conductor portion 62 disposed in a U phase slot 21 on an upper side portion of the cross section of the stator 1, and shows the slot conductor portion 61 and the upstanding conductor portion 62 disposed in a W phase slot 21 on a lower side portion of the cross section of the stator 1. As shown in FIG. 2, an outer peripheral side bottom portion of the auxiliary slot portion 41 of the auxiliary core portion 4 is formed in an inclined shape that corresponds to the inclined shape of a U phase upstanding conductor portion 62A and a V phase upstanding conductor portion 62A positioned on the outermost peripheral side R2. Note that an angle of incline of the W phase upstanding conductor portion 62 is smaller (gentler) than the angle of incline of the W phase auxiliary slot portion 41 (see the lower side portion of the cross section of the stator 1 in FIG. 1).

Further, as shown in FIGS. 1 and 2, a cross-sectional shape of the coil end conductor portion 63 of each phase is flatter in the radial direction R of the stator core 2 than a cross-sectional shape of the slot conductor portion 61 of each phase to prevent an increase in the size of the coil end portion 60 in the radial direction R. In other words, the coil end conductor portion 63 has a cross-sectional shape that is thinner in the radial direction R than in the axial direction L. By reducing the thickness of the coil end conductor portion 63 in the radial direction R, the angle of incline of the upstanding conductor portion 62 (the angle of incline of the stator core 2 relative to the axial direction L) can be reduced. As a result, a radial direction width (sectional area) of the yoke portion 42 positioned on the outer peripheral side R2 of the auxiliary slot portion 41 can be increased.

Note that inter-phase insulating papers 79 are disposed between the coil end conductor portions 63 of the coil conductors 6U, 6V, 6W of the three phases.

Next, an example of a method of manufacturing the stator 1 according to this embodiment will be described.

In this embodiment, the main core portion 3 is formed as an annular integral core by stacking a plurality of electromagnetic steel plates 25, and the plurality of divided cores 4A constituting the auxiliary core portion 4 is formed by stacking a plurality of electromagnetic steel plates 25. To form the auxiliary slot portion 41 while forming the respective divided cores 4A, as shown in FIGS. 11 and 12, a radial dimension R1 of a slot groove 415 formed from the inner peripheral side R1 of each electromagnetic steel plate 25 is set to increase steadily from the electromagnetic steel plate 25 positioned on the center side of the axial direction L toward the electromagnetic steel plate 25 positioned on the outside of the axial direction L. Thus, when the plurality of electromagnetic steel plates 25 are stacked, the outer peripheral side bottom portion of the auxiliary slot portion 41 can be formed in each divided core 4A in an inclined shape having a number of minute steps corresponding to the number of electromagnetic steel plates 25 (between approximately 10 and 50, for example).

Figure 5:
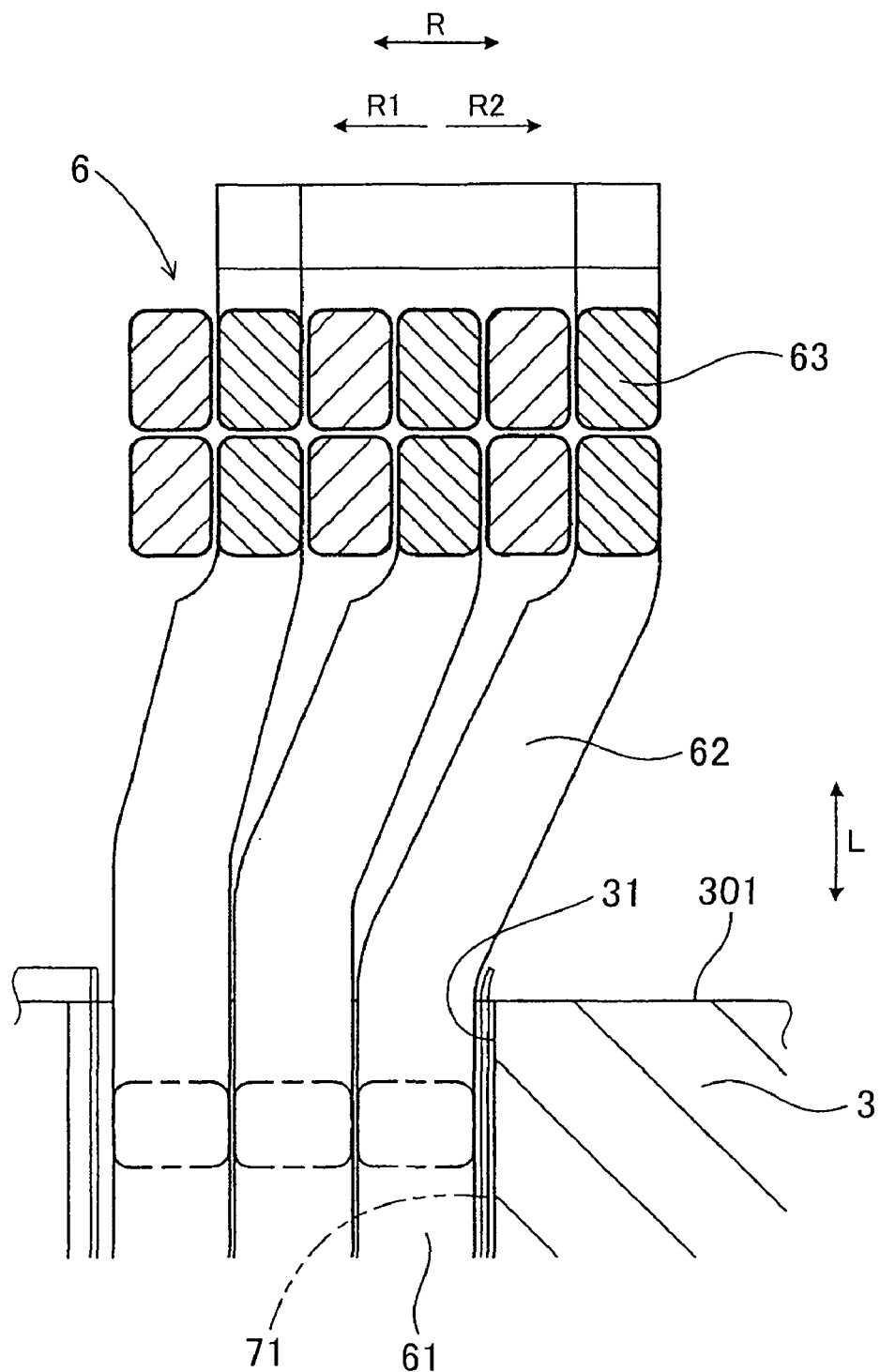
FIG. 5 is an illustrative sectional view showing an enlargement of the periphery of the coil end portion when the coil conductor is disposed in the main core portion, according to the first embodiment.

Further, as shown in FIG. 7, the main insulating papers 71 are disposed respectively in the main slot portions 31 of the main core portion 3, and as shown in FIGS. 4 and 5, the plurality of slot conductor portions 61 of the coil conductors 6 of the same phase are disposed on the inner peripheral side R1 of each main insulating paper 71. As shown in FIG. 2, when disposing the slot conductor portions 61, the inter-phase insulating paper 79 is disposed between a coil end conductor portion 63 of one phase and a coil end conductor portion 63 of another phase.

Next, as shown in FIG. 8, the wedge 712 serving as an insulating material is disposed on the inner peripheral side R1 of each main slot portion 31 opposite the end portion of the main insulating paper 71.

Further, once the divided auxiliary insulating papers 73 have been disposed in the respective divided cores 4A, as shown in FIGS. 11 and 12, the divided cores 4A provided with the divided auxiliary insulating papers 73 are disposed in sequence on the two axial end surfaces 301 of the main core portion 3, as shown in FIG. 6. At this time, as shown in FIG. 2, the plurality of upstanding conductor portions 62 of the coil conductors 6 disposed in the main core portion 3 are disposed in the auxiliary slot portions 41 of the respective divided cores 4A. Also at this time, the annular auxiliary insulating papers 74 are disposed between the coil conductors 6U, 6V, 6W of the three phases and the respective divided cores 4A, and the seam portions 742 of the annular auxiliary insulating papers 74 are disposed on the surface of the seam portions between the divided auxiliary insulating papers 73 disposed in the segmented slots 412 of the respective divided cores 4A (see FIG. 14).

Next, as shown in FIGS. 1 and 9, the sleeve 5 is attached to the outer peripheral surface of the auxiliary core portion 4 combining the plurality of divided cores 4A, and by fastening the axial end portion 511 of the main body portion 51 of the sleeve 5 to the axial end surface 201 of the auxiliary core portion 4 via the crimping ring 53, the attachment portion 32 of the main core portion 3 is sandwiched between the sleeve attachment portions 52 of the auxiliary core portion 4 such that the respective auxiliary core portions 4 are connected to the main core portion 3.

Thus, the stator 1 in which the coil conductors 6U, 6V, 6W of the three phases are disposed in the plurality of slots 21 provided in the stator core 2 can be manufactured.

In the stator 1 according to this embodiment, the shape of the stator core 2 is modified in a case where the coil conductors 6 are disposed in a distributed winding condition.

More specifically, by connecting the auxiliary core portion 4 to the two axial end surfaces 301 of the main core portion 3, the stator core 2 according to this embodiment is formed not only in the portion opposing the slot conductor portion 61 but also in the portion opposing the upstanding conductor portion 62. Hence, when the stator 1 according to this embodiment is used, a magnetic circuit can also be formed in a position opposing the upstanding conductor portion 62.

Further, the outer peripheral side bottom portion of the auxiliary slot portion 41 of the auxiliary core portion 4 is formed in an inclined shape that corresponds to the inclined shape of the upstanding conductor portion 62A positioned on the outermost peripheral side R2 (the outside of the radial direction R of the stator core 2). As a result, the radial direction R width of the yoke portion 42 positioned on the outer peripheral side R2 of the auxiliary slot portion 41 can be maximized while avoiding interference with the upstanding conductor portion 62. Hence, when the stator 1 is used, the region in which the magnetic circuit is formed can be enlarged.

Moreover, the auxiliary core portion 4 is provided in accordance with the formation position of the upstanding conductor portion 62, and therefore an increase in the overall size of the stator 1 due to disposal of the auxiliary core portion 4 can be prevented.

Hence, with the stator 1 according to this embodiment, when the coil conductors 6 are disposed in the stator core 2 in a distributed winding condition, output characteristics of a rotating electric machine employing the stator 1 can be improved while preventing an increase in the size of the stator 1.

Furthermore, in this embodiment, the circularity of the stator 1 can be maintained at a high level of precision by the main core portion 3 formed as an integral core. Moreover, by dividing the auxiliary core portion 4 into the plurality of divided cores 4A, the respective divided cores 4A can be disposed relative to the upstanding conductor portion 62 of the coil conductor 6 easily from the outer peripheral side R2. Further, by dividing the insulating paper for providing insulation between the stator core 2 and the coil conductor 6 into the main insulating paper 71 and the auxiliary insulating paper 72, the main insulating paper 71 can be disposed relative to the main slot portion 31 of the main core portion 3 easily and the auxiliary insulating paper 72 can be disposed relative to the auxiliary slot portions 41 of the respective divided cores 4A constituting the auxiliary core portion 4 easily. As a result, the stator 1 can be assembled easily.

Further, in the rotating electric machine formed using the stator 1 according to this embodiment, the rotor 101, which is disposed rotatably opposite the stator 1, is formed with a length corresponding to the length obtained when the main core portion 3 is connected to the auxiliary core portion 4 (see FIGS. 1 and 2). By forming the rotor 101 in the portion corresponding to the auxiliary core portion 4 also, the magnetic circuit that is formed when the rotating electric machine is used can be made more powerful, enabling a further improvement in the output characteristics of the rotating electric machine.

Second Embodiment

Figure 15:
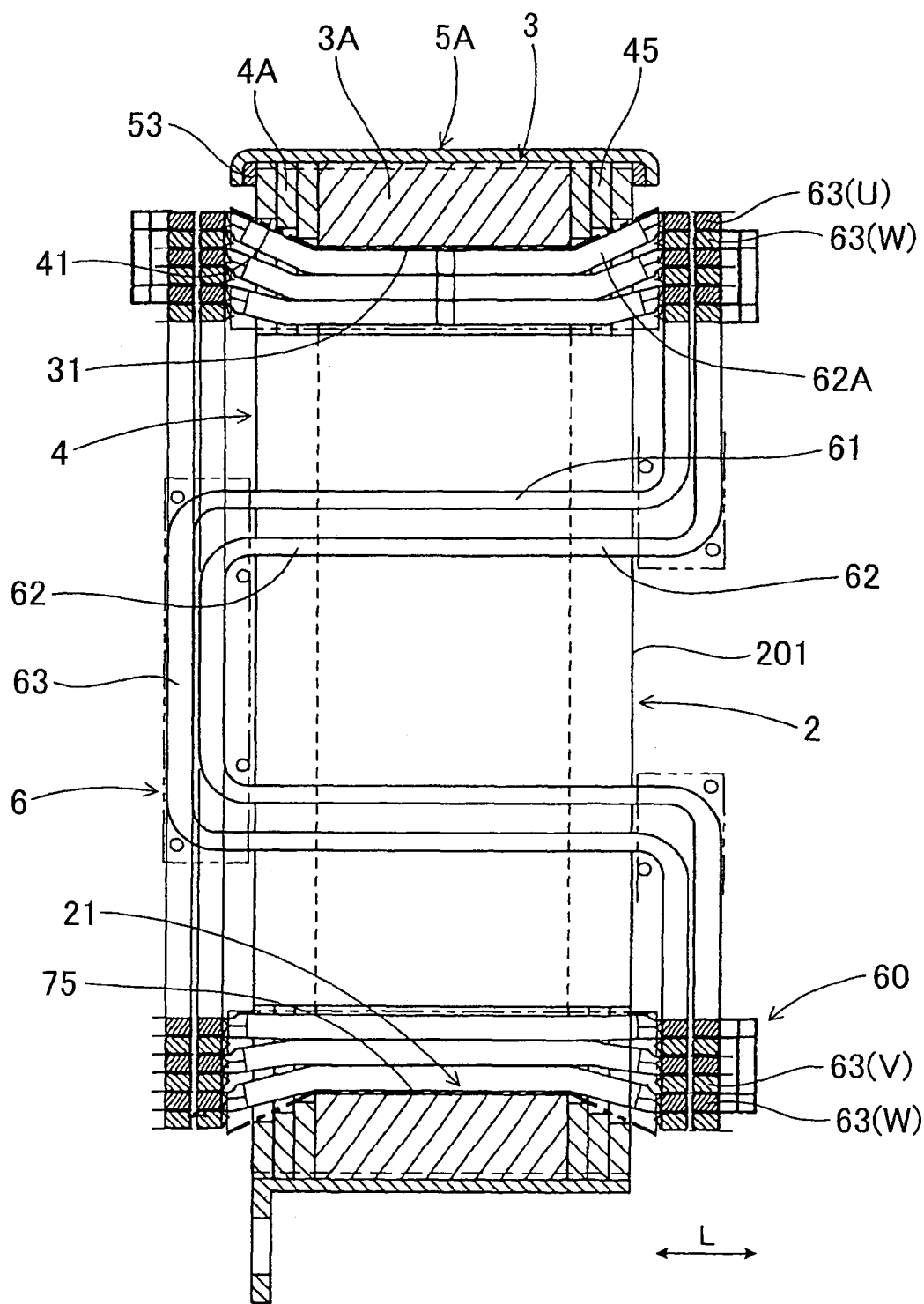
FIG. 15 is an illustrative sectional view showing a stator according to a second embodiment.
Figure 16:
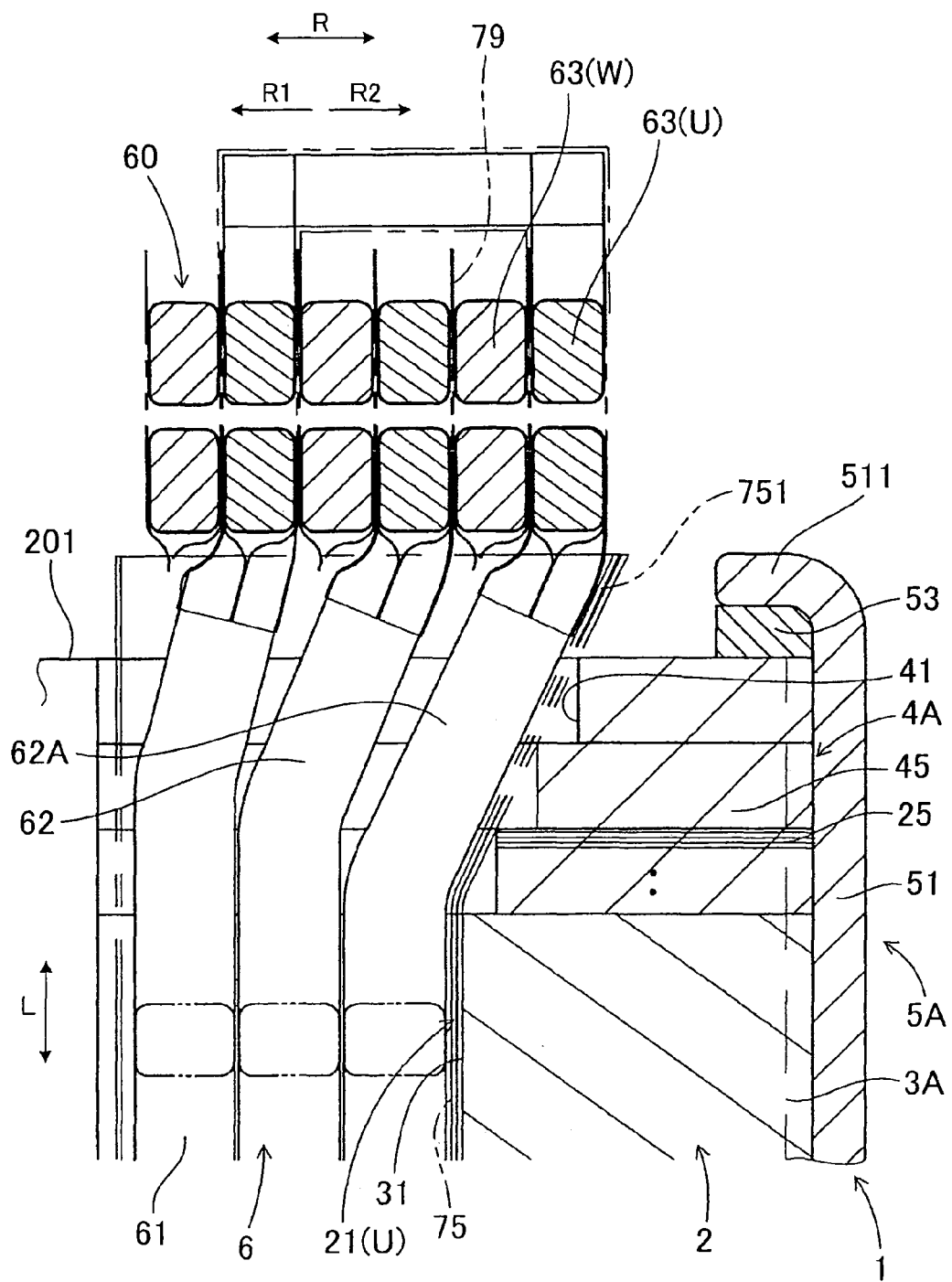
FIG. 16 is an illustrative sectional view showing an enlargement of the periphery of a coil end portion according to the second embodiment.
Figure 17:
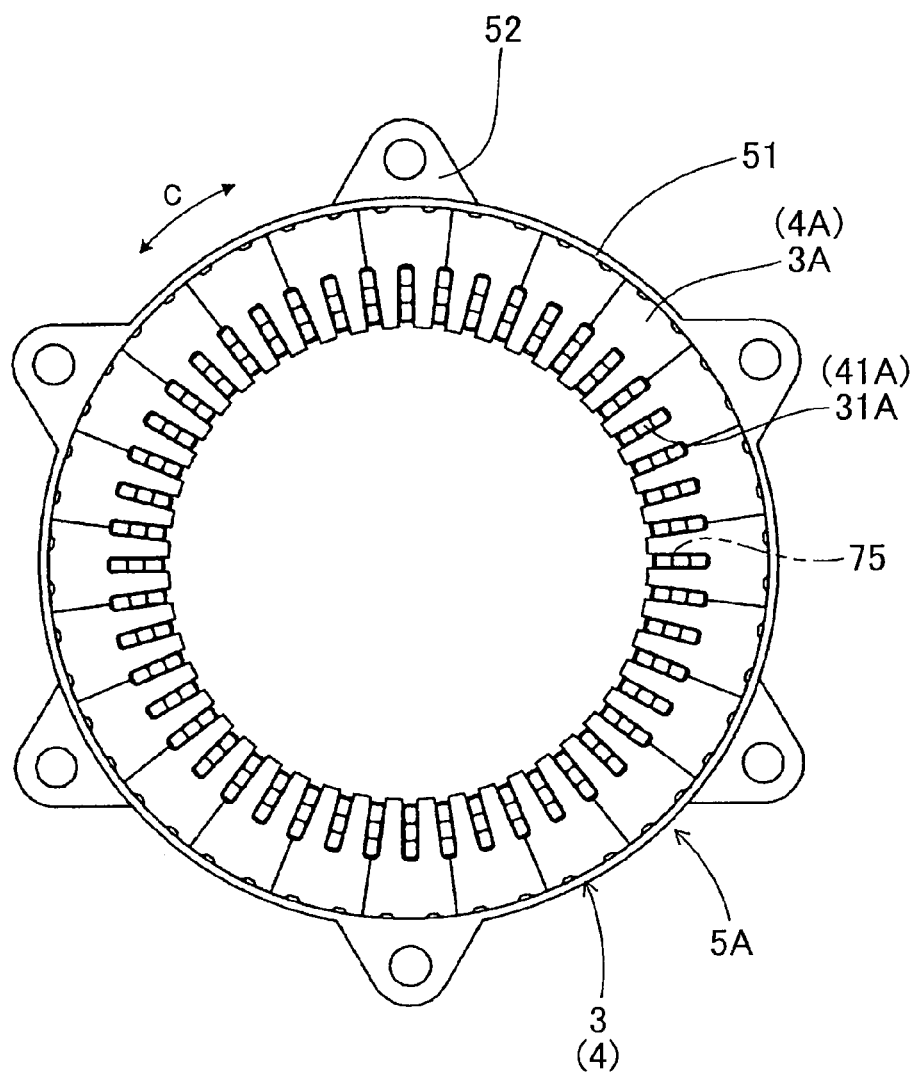
FIG. 17 is an illustrative plan view showing a state in which a plurality of divided cores constituting a main core portion are crimped by a sleeve, according to the second embodiment.

As shown in FIGS. 15 to 17, this embodiment relates to a stator 1 which is formed by combining a plurality of divided cores 3A, 4A formed by dividing the main core portion 3 and the auxiliary core portion 4 in a plurality of locations in the circumferential direction C of the stator core 2.

Figure 18:
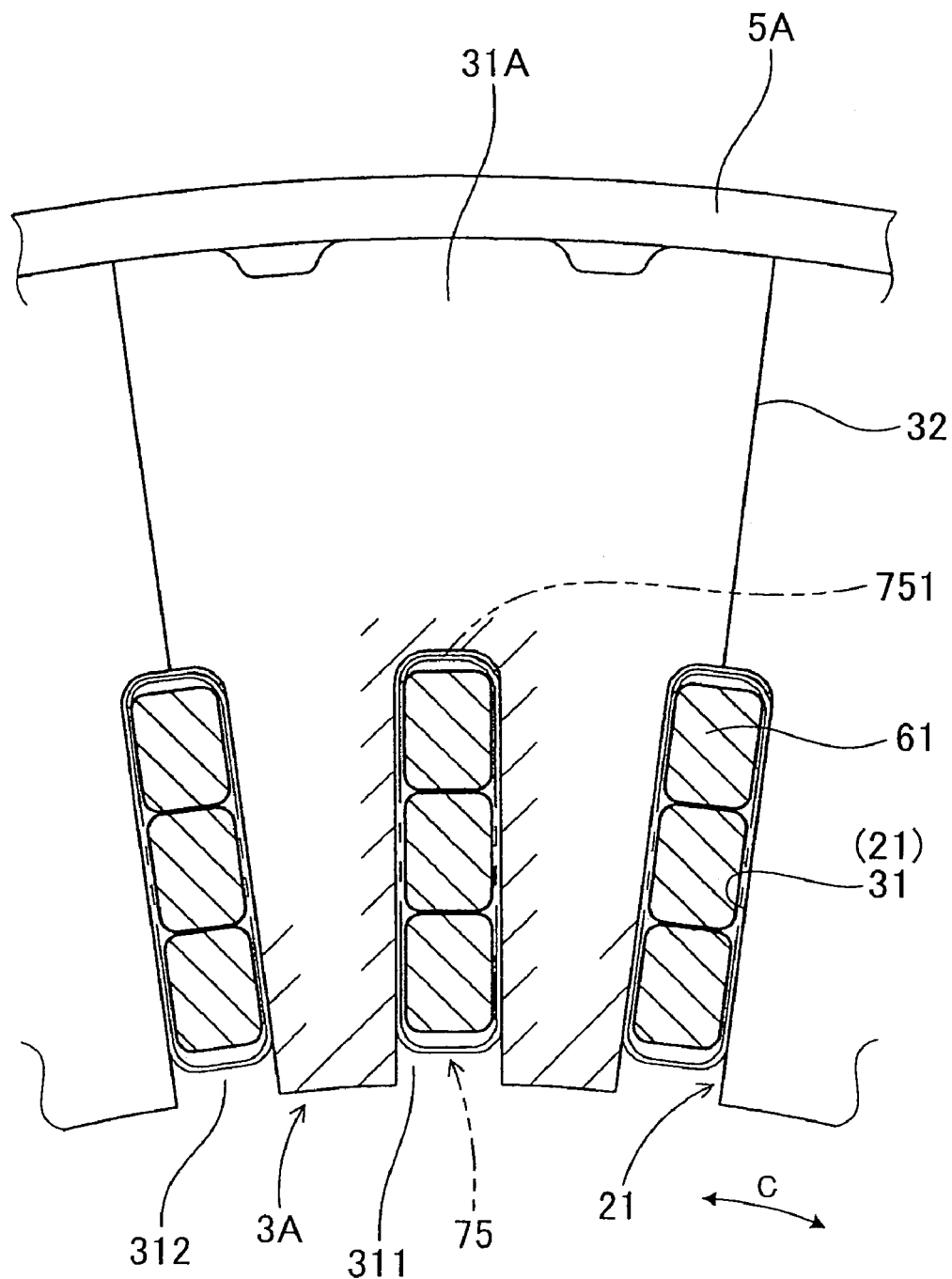
FIG. 18 is an illustrative sectional view showing an enlargement of a state in which a slot conductor portion of a coil conductor is disposed in the main core portion, according to the second embodiment.
Figure 20:
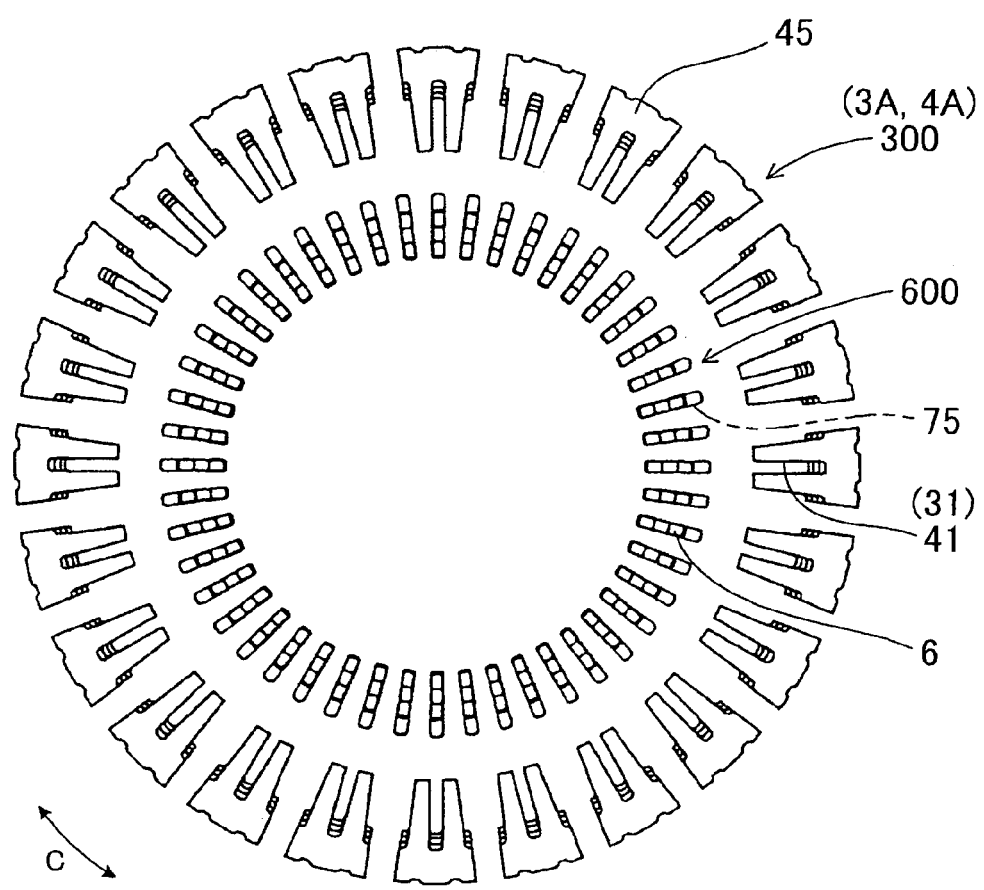
FIG. 20 is an illustrative plan view showing a state in which the divided core connected body is disposed relative to the coil conductor assembly, according to the second embodiment.
Figure 22:
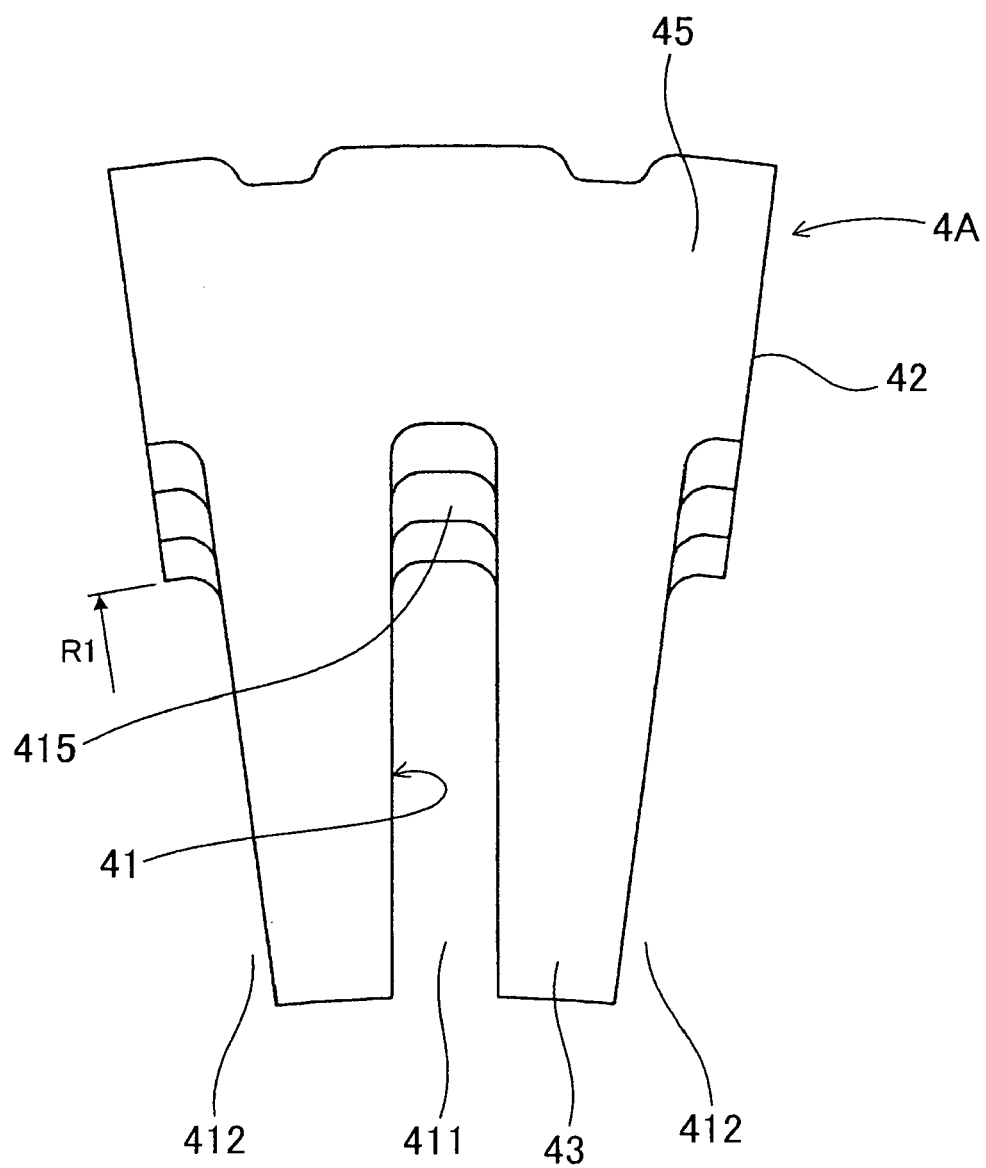
FIG. 22 is an illustrative plan view showing an auxiliary core portion according to the second embodiment.

As shown in FIGS. 18, 20, 22, the divided cores 3A, 4A constituting the main core portion 3 and the auxiliary core portion 4 according to this embodiment are formed similarly to the first embodiment by segmenting the main core portion 3 and auxiliary core portion 4 at yoke portions 32, 42 positioned on the outer peripheral side R2 of the pair of slots 21 sandwiching a single slot 21. Slots 312, 412 segmented into halves are respectively formed on either side of a single slot 311, 411 in each divided core 3A, 4A. The stator core 2 is formed with 48 slots 21 and 24 divided cores 3A, 4A.

Further, as shown in FIGS. 15 and 17, the main core portion 3 and the auxiliary core portion 4 are fitted into an annular sleeve 5A for holding the plurality of divided cores 3A, 4A in a combined state. The sleeve 5A according to this embodiment is formed in a shape that fits the entire outer peripheral surface of the main core portion 3 and the pair of auxiliary core portions 4.

Further, as shown in FIG. 16, an outer peripheral side bottom portion of the auxiliary slot portion 41 of the auxiliary core portion 4 according to this embodiment is formed in a stepped shape that corresponds to the inclined shape of the upstanding conductor portion 62A positioned on the outermost peripheral side R2. The divided cores 4A constituting the auxiliary core portion 4 according to this embodiment are formed by stacking core blocks 45, each of which is formed by stacking a plurality of electromagnetic steel plates 25 in the axial direction L of the stator core 2, in a plurality of steps in the axial direction L of the stator core 2.

Figure 21:
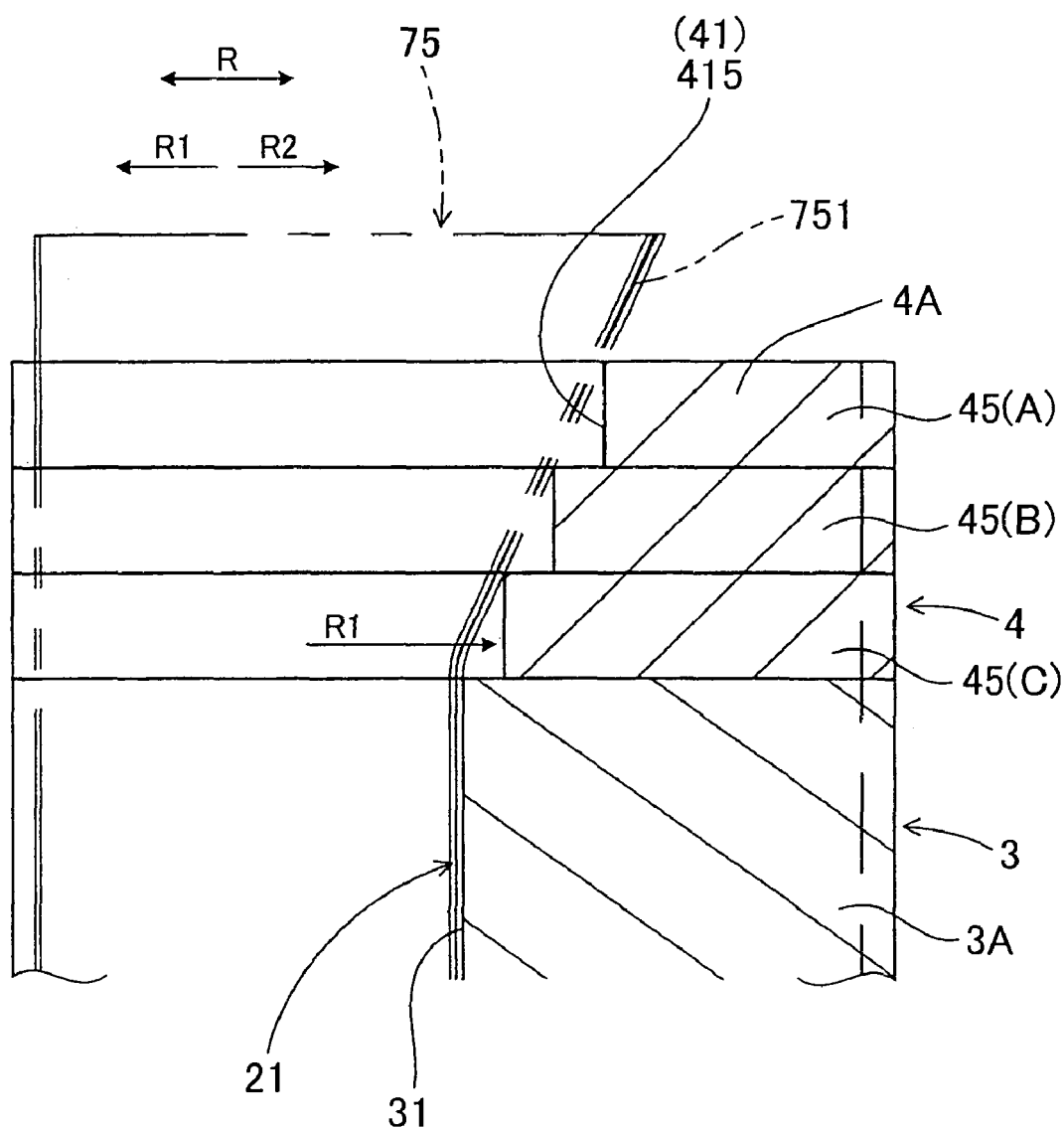
FIG. 21 is an illustrative sectional view showing a state in which the divided auxiliary insulating paper is disposed on the divided core connected body, according to the second embodiment.

As shown in FIGS. 21 and 22, the slot groove 415 for forming the auxiliary slot portion 41 is formed on the inner peripheral side R1 of each core block 45. The radial dimension R1 of the slot groove 415 in the core block 45 positioned on the outer side of the axial direction L of the stator core 2 is set larger than the radial dimension R1 of the slot groove 415 in the core block 45 positioned on the central side of the axial direction L of the stator core 2.

More specifically, the divided cores 4A constituting the auxiliary core portion 4 according to this embodiment are formed by stacking the core blocks 45 in three steps in the axial direction L of the stator core 2. The radial dimension R1 of the slot groove 415 of a core block 45A positioned on the outermost side of the axial direction L is larger than the radial dimension R1 of the slot groove 415 of a core block 45B positioned intermediately, and the radial dimension R1 of the slot groove 415 of the core block 45B positioned intermediately is larger than the radial dimension R1 of the slot groove 415 of a core block 45C positioned on the centermost side of the axial direction L.

Further, as shown in FIG. 16, an insulating paper 75 is disposed between the stator core 2 and the coil conductor 6 according to this embodiment so as to continuously (integrally) cover the slot conductor portion 61 and the pair of upstanding conductor portions 62 disposed in each slot 21. The insulating paper 75 provides insulation between the main core portion 3 and the slot conductor portion 61 and between the pair of auxiliary core portions 4 and the pair of coil end conductor portions 63.

Figure 25:
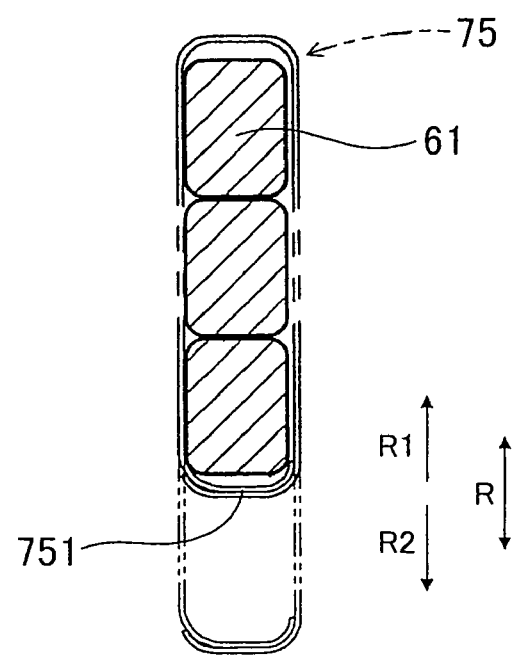
FIG. 25 is an illustrative sectional view showing a state in which the slot conductor portion of the coil conductor is enveloped by the insulating paper, according to the second embodiment.

Further, as shown in FIGS. 18 and 25, in each slot 21, the insulating paper 75 is disposed so as to envelop all of the slot conductor portions 61 and upstanding conductor portions 62 disposed in each slot 21 collectively from the inner peripheral side R1 (the center side of the radial direction R) of the stator core 2, and such that end portions 751 of the insulating paper 75 overlap on the outside of the radial direction R.

Figure 24:
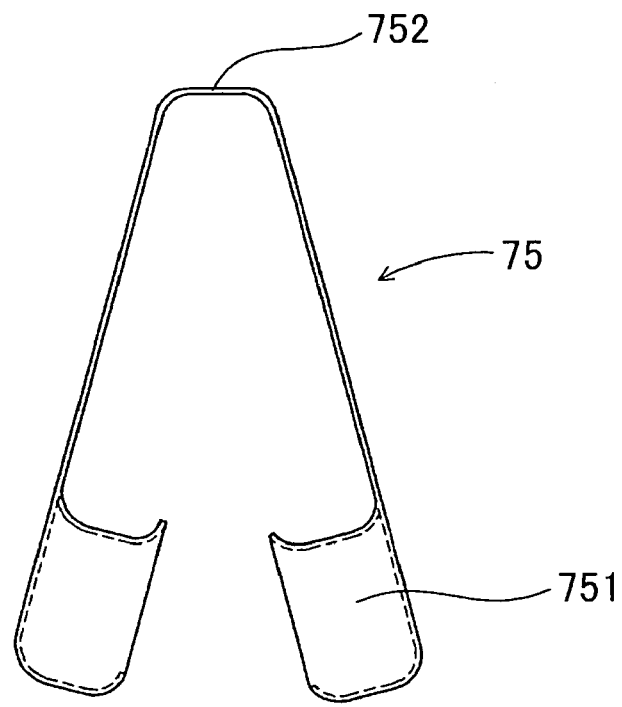
FIG. 24 is an illustrative plan view showing formation of the insulating paper according to the second embodiment.

Further, the insulating paper 75 may be formed by forming the overlapping end portions 751 on either side thereof, as shown in FIG. 23, and then bending the insulating paper 75 in a central portion 752, as shown in FIG. 24.

Figure 19:
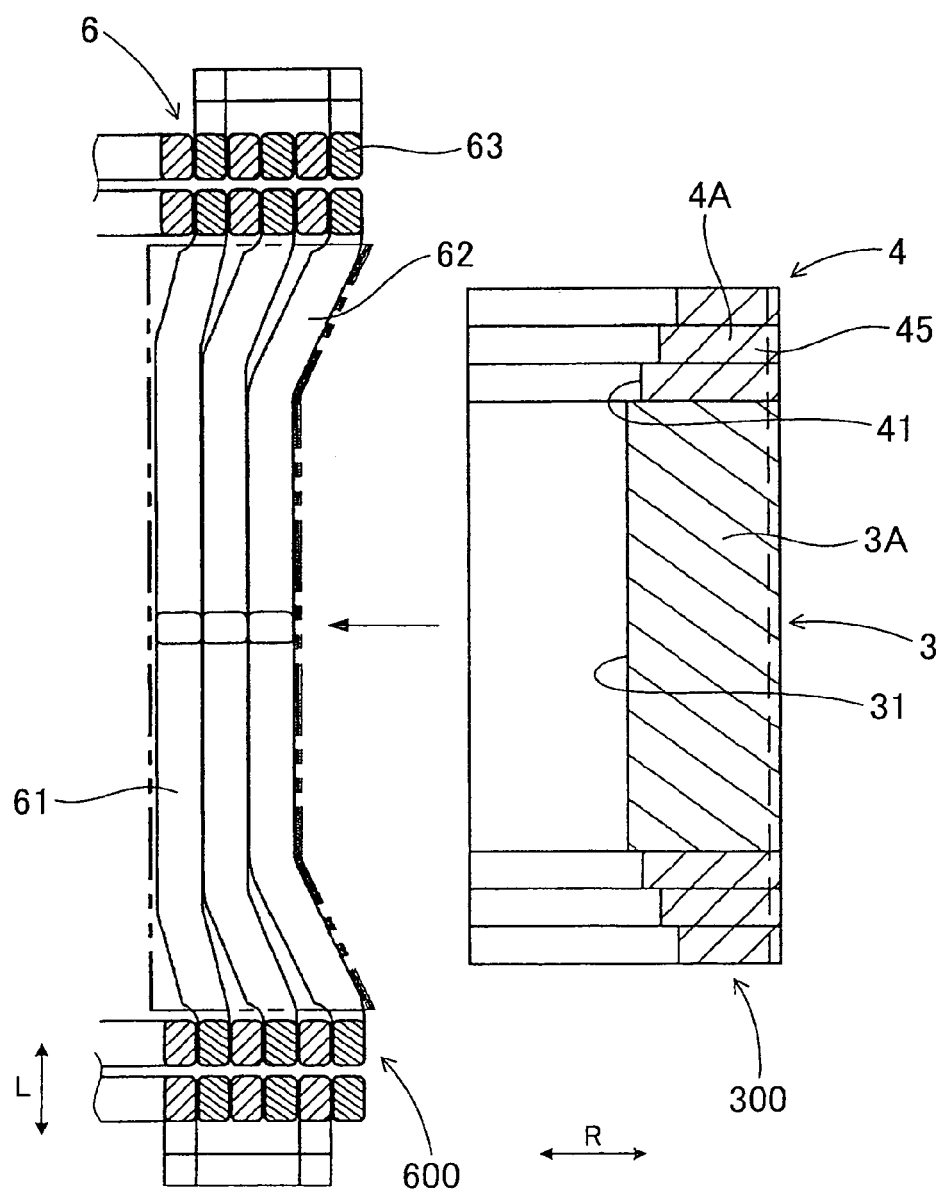
FIG. 19 is an illustrative sectional view showing a state in which a divided core connected body is disposed relative to a coil conductor assembly, according to the second embodiment.

As shown in FIGS. 19 and 20, when manufacturing the stator 1 according to this embodiment, the divided cores 4A constituting the auxiliary core portion 4 are formed by stacking the three core blocks 45, and the divided cores 4A constituting the auxiliary core portion 4 are connected to the two axial end surfaces 301 of the divided cores 3A constituting the main core portion 3 to form a plurality of (24 in this embodiment) divided core connected bodies 300. Further, the coil conductors 6U, 6V, 6W of the three phases are assembled in a condition for forming the stator 1, thereby forming a coil conductor assembly 600.

The insulating paper 75 is then disposed relative to the plurality of slot conductor portions 61 and pairs of upstanding conductor portions 62 in the coil conductor assembly 600. At this time, as shown in FIG. 25, the insulating paper 75 is disposed so as to envelop all of the slot conductor portions 61 and pairs of upstanding conductor portions 62 disposed in the respective slots 21 collectively from the inner peripheral side R1 (the center side of the radial direction R of the stator core 2). Furthermore, the overlapping end portions 751 of the insulating paper 75 are overlapped on the outer peripheral side R2 (the outside of the radial direction R of the stator core 2).

Next, as shown in FIGS. 19 and 20, the divided core connected body 300 described above is disposed relative to the coil conductor assembly 600 provided with the insulating paper 75 from the outer peripheral side R2. At this time, the slot conductor portion 61 and the pair of upstanding conductor portions 62 provided with the insulating paper 75 are disposed in the slots 21 (the main slot portion 31 and the auxiliary slot portion 41) of the divided core connected body 300.

Next, as shown in FIGS. 17 and 18, the sleeve 5A is attached to the outer peripheral surface of the stator core 2 in which the plurality of divided core connected bodies 300 are combined, and the axial end portion 511 of the main body portion 51 of the sleeve 5A is fastened to the axial end surface of the auxiliary core portion 4 via the crimping ring 53 such that the respective auxiliary core portions 4 are connected to the main core portion 3.

Thus, the stator 1 in which the coil conductors 6U, 6V, 6W of the three phases are disposed in the plurality of slots 21 in the stator core 2 can be manufactured.

In this embodiment, the insulating paper 75 can be disposed on the slot conductor portion 61 and the pair of upstanding conductor portions 62 of the coil conductor 6 to be disposed in each slot 21 at once, and therefore the insulating paper 75 can be assembled easily. Further, by disposing the divided core connected body 300 relative to the coil conductor assembly 600 provided with the insulating paper 75 from the outer peripheral side R2, the coil conductor 6 can be attached to the stator core 2 easily. Moreover, in this embodiment, the overlapping end portions 751 of the insulating paper 75 are not positioned on the inner peripheral side R1 of each slot 21, and therefore an insulating material such as a wedge need not be disposed on the inner peripheral side R1 of each slot 21.

Similar actions and effects to those of the first embodiment described above can be obtained with the other constitutions of this embodiment.

Third Embodiment

This embodiment is an example in which a stepped shape or an inclined shape is formed on the outer peripheral side bottom portion of the slots 21 in the stator core 2.

Figure 26:
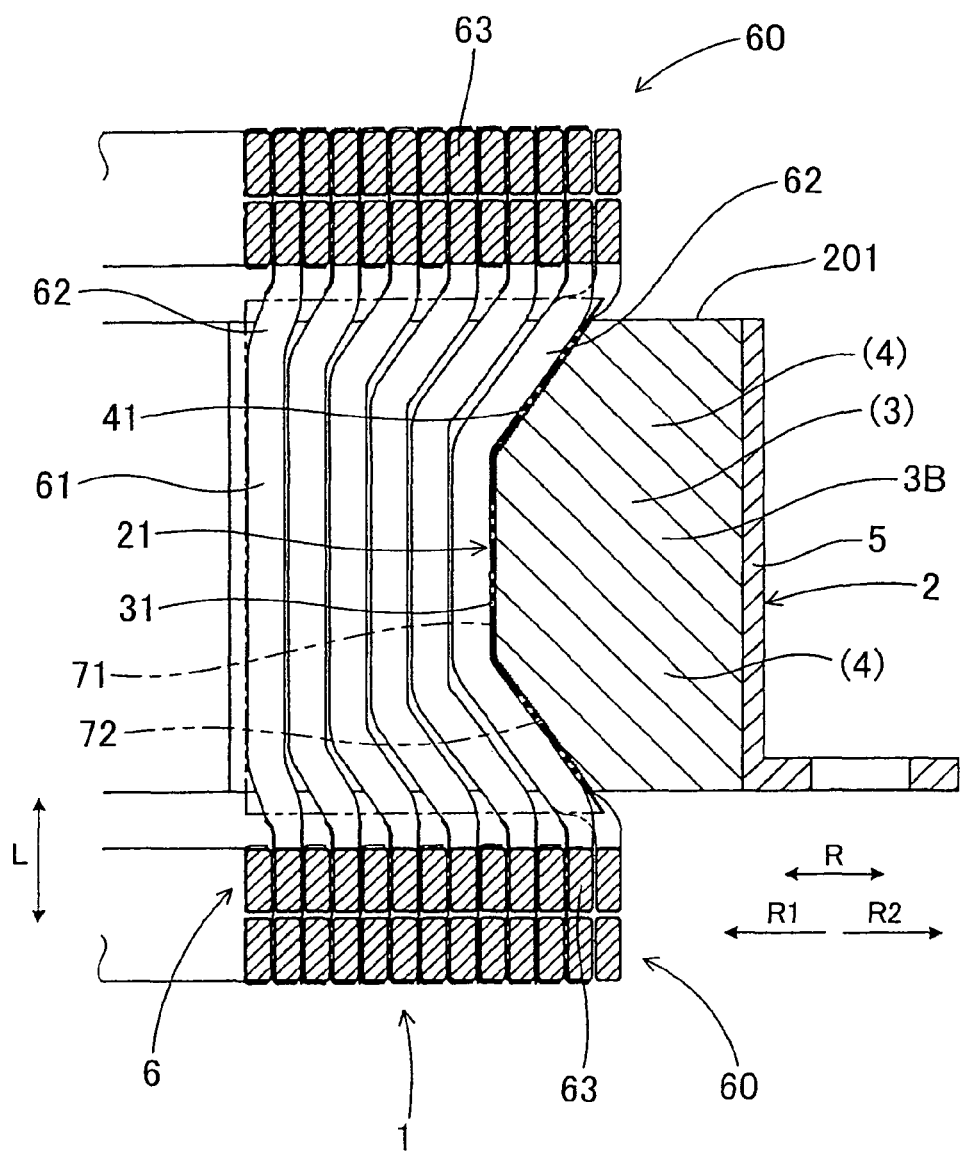
FIG. 26 is an illustrative sectional view showing a stator according to a third embodiment.
Figure 27:
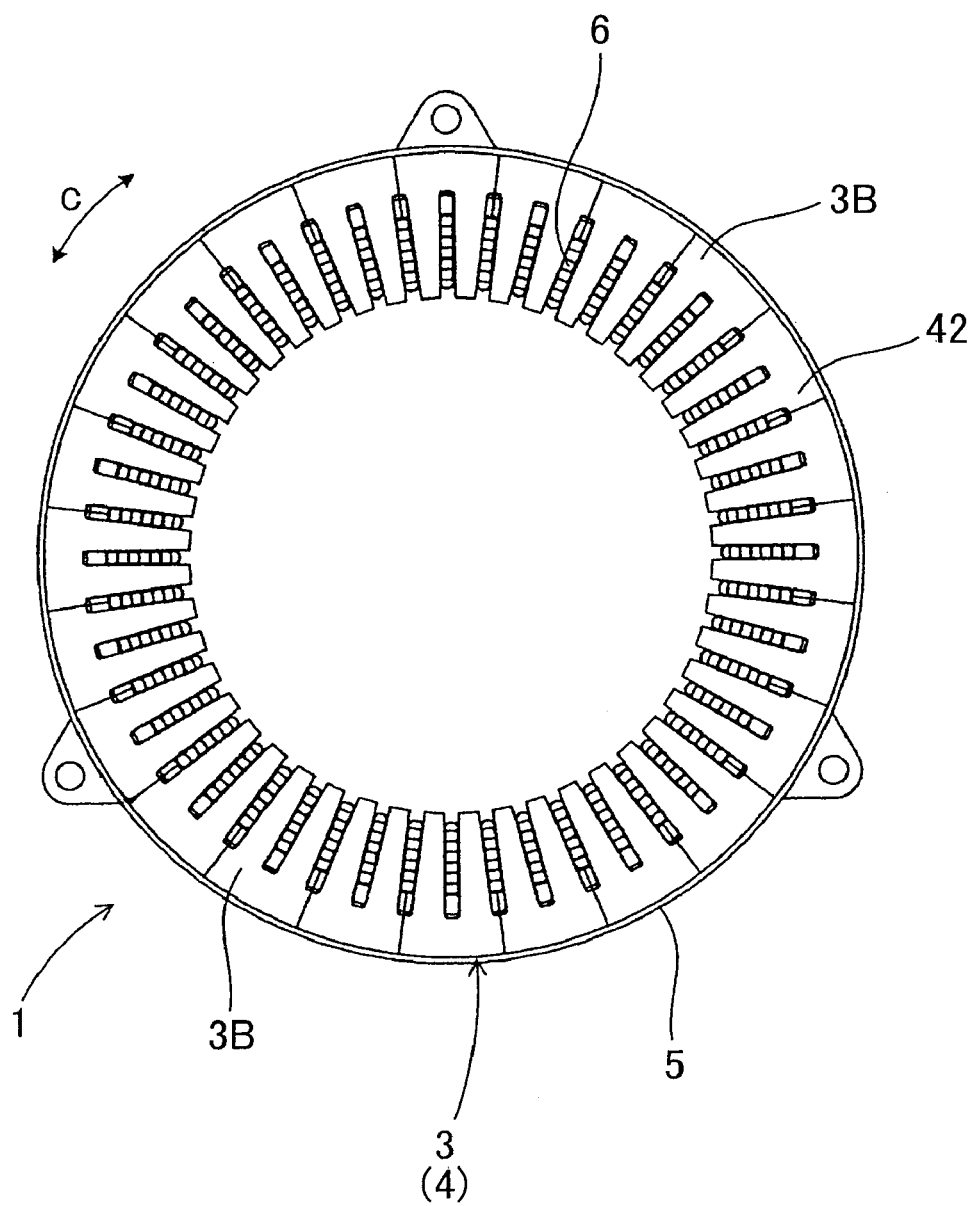
FIG. 27 is an illustrative plan view showing the stator according to the third embodiment.

As shown in FIGS. 26 and 27, the outer peripheral side bottom portion of the slot 21 according to this embodiment is formed in a stepped shape or an inclined shape that increases in diameter toward the outer peripheral side R2 as the two outside portions thereof in the axial direction L of the stator core 2 approach the outer side of the axial direction L of the stator core 2. A remaining portion of the outer peripheral side bottom portion is formed parallel to the axial direction L of the stator core 2.

The stator core 2 according to this embodiment is also formed by stacking the plurality of electromagnetic steel plates 25 in the axial direction L. In the stator core 2 according to this embodiment, the main core portion 3 formed in a position corresponding to the slot conductor portion 61 and the auxiliary core portion 4 formed in a position corresponding to the upstanding conductor portion 62 are formed integrally in the axial direction L by stacking the plurality of electromagnetic steel plates 25.

In the stator core 2 according to this embodiment also, the plurality of divided cores 3B divided in a plurality of locations in the circumferential direction C of the stator core 2 are combined. The divided cores 3B according to this embodiment are formed by segmenting the entire stator core 2 in the axial direction L (in a state where the main core portion 3 and the auxiliary core portion 4 are connected) at the yoke portions 42 positioned on the outer peripheral side R2 of the pair of slots 21 sandwiching a single slot 21. Further, all of the plurality of divided cores 3B are fitted integrally into the annular sleeve 5.

The coil conductors 6 of the three phases according to this embodiment are arranged in sixes in the radial direction R of the slot 21. The coil conductor 6 positioned on the outermost peripheral side is formed in a shape that corresponds to the shape of the outer peripheral side bottom portion of the slot 21 (i.e. a shape in which a portion that inclines toward the outer peripheral side R2 is formed on both sides of the portion that is parallel to the axial direction L), and the coil conductor 6 positioned on the inner peripheral side R1 thereof is formed in a shape that corresponds to the shape of the coil conductor 6 positioned on the outer peripheral side R2. The length of the inclined portion then steadily decreases toward the coil conductor 6 positioned on the innermost peripheral side R1.

Similar actions and effects to those of the first embodiment described above can be obtained with the other constitutions of this embodiment.

Note that in the first to third embodiments described above, the U phase, V phase and W phase slots 21 provided in the stator core 2 are formed such that a plurality of slots 21 of the same phase are disposed adjacent to each other and this pattern is repeated in a fixed arrangement sequence. However, the U phase, V phase and W phase slots 21 may also be formed such that adjacent slots 21 of the same phase are gathered together to form a single slot 21 such that one slot of each of the U phase, V phase, and W phase is provided, and the slots 21 of the U phase, V phase and W phase are formed repeatedly in that order. In so doing, the number of divisions of the stator core 2 can be reduced greatly.

The invention claimed is:

1. A stator in which coil conductors of three phases are disposed in a plurality of slots provided in a stator core, wherein the coil conductors are formed by connecting a plurality of slot conductor portions disposed in the slot, a plurality of coil end conductor portions extending in a circumferential direction of the stator core on an outer side of an axial end surface of the stator core, and a plurality of upstanding conductor portions, each of which connects the coil end conductor portion and the slot conductor portion, the plurality of slot conductor portions and the plurality of upstanding conductor portions are disposed in series in a radial direction of the stator core, at least the upstanding conductor portion positioned on an outermost peripheral side is formed in an inclined shape that steadily increases in diameter toward the outer peripheral side while approaching an axial outer side of the stator core, the stator core is formed by connecting a main core portion formed with a main slot portion for disposing the slot conductor portion and an auxiliary core portion formed with an auxiliary slot portion for disposing the upstanding conductor portion, an outer peripheral side bottom portion of the auxiliary slot portion in the auxiliary core portion is formed in a stepped shape or an inclined shape that corresponds to the inclined shape of the upstanding conductor portion positioned on the outermost peripheral side, the main core portion is formed as an integral core having an annular shape, while the auxiliary core portion is formed by combining a plurality of divided cores divided in a plurality of locations in the circumferential direction of the stator core, the auxiliary core portion is fitted into an annular sleeve for holding the plurality of divided cores in a combined state, the slot is a parallel slot having circumferential direction side faces that are parallel to each other in the radial direction of the stator core, the parallel slot is formed in a multiple of two, and the plurality of divided cores are segmented at a yoke portion positioned on an outer peripheral side of a pair of slots sandwiching a single slot.

2. The stator according to claim 1, wherein the main core portion is formed by stacking a plurality of electromagnetic steel plates in the axial direction of the stator core, the auxiliary core portion is formed by stacking core blocks, each of which is formed by stacking a plurality of electromagnetic steel plates in the axial direction of the stator core, into a plurality of steps in the axial direction of the stator core, and the auxiliary slot portion is formed by setting a radial dimension of a slot groove formed from an inner peripheral side of the core block to be larger in the core block positioned on the axial outer side of the stator core than in the core block positioned on an axial center side of the stator core.

3. The stator according to claim 1, wherein the main core portion is formed by stacking a plurality of electromagnetic steel plates in the axial direction of the stator core, and the auxiliary core portion is formed by compression-molding a soft magnetic powder.

4. The stator according to claim 1, wherein a main insulating paper is disposed in each main slot portion of the main core portion to provide insulation between the main core portion and the slot conductor portion, and an auxiliary insulating paper is disposed in the auxiliary slot portion of each divided core in the auxiliary core portion to provide insulation between all of the auxiliary slot portions in the divided core and the upstanding conductor portion.

5. The stator according to claim 1, wherein the main core portion is formed integrally in the axial direction by combining a plurality of divided cores divided in a plurality of locations in the circumferential direction of the stator core, and the main core portion and the auxiliary core portion are fitted into the annular sleeve for holding the plurality of divided cores in a combined state.

6. The stator according to claim 5, wherein an insulating paper for providing insulation between the main core portion and the slot conductor portion and between the auxiliary core portion and the coil end conductor portion is disposed continuously on the slot conductor portion and the upstanding conductor portion disposed in each slot.

7. The stator according to claim 6, wherein the insulating paper is disposed in each slot so as to envelop all of the slot conductor portions and the upstanding conductor portions disposed in the respective slots collectively from the inner peripheral side of the stator core, and such that end portions of the insulating paper overlap on the outer peripheral side.

8. The stator according to claim 1, wherein the coil conductor is formed from an angular wire having a substantially square cross section and disposed in the slot in a distributed winding condition such that in the coil end conductor portion, the coil conductor overlaps the coil conductor of another phase in the radial direction, at least a portion of the coil end conductor portion is disposed further toward a radial outer side than the slot conductor portion, and at least the upstanding conductor portion positioned on the outermost peripheral side is formed in an inclined shape that increases in diameter toward the outer peripheral side while approaching the axial outer side of the stator core.

9. The stator according to claim 8, wherein the coil conductor takes a wave winding coil shape in which the coil end conductor portion is connected to the slot conductor portion and the upstanding conductor portion alternately on one axial end side and another axial end side of the stator core.

10. The stator according to claim 1, wherein the coil conductor is constituted by coil conductors of three phases, namely a U phase, a V phase and a W phase, in the stator core, U phase, V phase and W phase slots are formed in adjacent pluralities and disposed repeatedly in a fixed arrangement sequence, the plurality of slot conductor portions and the plurality of upstanding conductor portions of the coil conductor of each phase are disposed in the slot of each phase in series in the radial direction of the stator core, the plurality of coil end conductor portions of coil conductors of the same phase drawn from adjacent slots of the same phase are disposed on the outer side of the axial end surface of the stator core in series in the axial direction of the stator core, the U phase coil end conductor portion and the V phase coil end conductor portion, the V phase coil end conductor portion and the W phase coil end conductor portion, or the W phase coil end conductor portion and the U phase coil end conductor portion are disposed so as to overlap alternately in the radial direction of the stator core in each portion of the circumferential direction of the stator core, and the auxiliary slot portion of the auxiliary core portion is formed in a stepped shape or an inclined shape that corresponds to the inclined shape of the upstanding conductor portion positioned on the outermost peripheral side.

11. The stator according to claim 1, wherein the coil end conductor portion has a cross-sectional shape that is thinner in the radial direction of the stator core than in the axial direction of the stator core.

12. A rotating electric machine employing the stator according to claim 1, wherein a rotor that is rotatably disposed opposing the stator is formed with a length that corresponds to a length of the main core portion and the auxiliary core portion when connected.

* * * * *